US011845832B2

(12) United States Patent
Louis

(10) Patent No.: US 11,845,832 B2
(45) Date of Patent: *Dec. 19, 2023

(54) METHOD OF MAKING A PEEK-PEOEK COPOLYMER AND COPOLYMER OBTAINED FROM THE METHOD

(71) Applicant: SOLVAY SPECIALTY POLYMERS USA, LLC, Alpharetta, GA (US)

(72) Inventor: Chantal Louis, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/618,901

(22) PCT Filed: Jun. 2, 2020

(86) PCT No.: PCT/EP2020/065154
§ 371 (c)(1),
(2) Date: Dec. 14, 2021

(87) PCT Pub. No.: WO2020/254097
PCT Pub. Date: Dec. 24, 2020

(65) Prior Publication Data
US 2022/0315699 A1     Oct. 6, 2022

Related U.S. Application Data

(60) Provisional application No. 62/864,040, filed on Jun. 20, 2019.

(30) Foreign Application Priority Data

Aug. 20, 2019   (EP) .................................. 19192597

(51) Int. Cl.
  C08G 65/40    (2006.01)
  C08G 65/46    (2006.01)
  C08K 3/26     (2006.01)

(52) U.S. Cl.
  CPC ......... *C08G 65/4012* (2013.01); *C08G 65/46* (2013.01); *C08K 3/26* (2013.01); *C08G 2650/40* (2013.01); *C08K 2003/262* (2013.01)

(58) Field of Classification Search
  CPC ....... C07C 45/45; C07C 45/455; C07C 45/46; C07C 45/48; C07C 45/64; B32B 27/285; B32B 27/288; B32B 15/08; B32B 15/098
  See application file for complete search history.

(56) References Cited

U.S. PATENT DOCUMENTS

| 4,657,990 A * | 4/1987 | Daoust ................... C08G 65/48 |
| | | 525/534 |
| 4,874,839 A * | 10/1989 | Montoya ................ C08G 65/46 |
| | | 528/480 |
| 5,110,894 A * | 5/1992 | Harris ..................... C08G 73/18 |
| | | 528/172 |
| 5,250,738 A | 10/1993 | Hackenbruch et al. |
| 5,300,693 A | 4/1994 | Gilb et al. |
| 9,133,111 B2 | 9/2015 | Louis et al. |

FOREIGN PATENT DOCUMENTS

| CN | 109679089 A | 4/2019 |
| EP | 1559542 A1 | 8/2005 |
| EP | 1459882 B1 | 2/2010 |
| JP | 01221426 A | 9/1989 |
| WO | 2011123790 A1 | 10/2011 |
| WO | 2018024744 A1 | 2/2018 |

OTHER PUBLICATIONS

Ben-Haida A. et al., "Synthesis of a Catechol-Based Poly(Ether Ether Ketone)("o-PEEK") by Classical Step-Growth Polymerization and by Entropically Driven Ring-Opening Polymerization of Macrocyclic Oligomers", Aug. 16, 2006, vol. 39, No. 19, pp. 6467-6472—American Chemical Society.

Murphy J., in "Additives for Plastics Handbook", 2nd Edition, 2001, Chapter 5.2.3., p. 43-48—Elsevier Advanced Technology.

Standard ASTM D3850-2012, "Standard Test Method for Rapid Thermal Degradation of Solid Electrical Insulating Materials by Thermogravimetric Method (TGA)", 2012, p. 1-4.

* cited by examiner

*Primary Examiner* — Christopher M Rodd
(74) *Attorney, Agent, or Firm* — Osha Bergman Watanabe & Burton LLP

(57) ABSTRACT

A method of making a PEEK-PEoEK copolymer having $R_{PEEK}$ and RPEoEK repeat units in a molar ratio $R_{PEEK}/R_{PEoEK}$ ranging from 95/5 to 45/55, the PEEK-PEoEK copolymer obtained from the method and the polymer composition including the PEEK-PEoEK copolymer, at least one reinforcing filler, at least one additive, or a combination thereof, shaped articles including the polymer composition, polymer-metal junctions including the polymer composition. Also described are methods of making the polymer composition, methods of making the shaped articles, and methods of making the polymer-metal junctions.

15 Claims, 1 Drawing Sheet

METHOD OF MAKING A PEEK-PEoEK COPOLYMER AND COPOLYMER OBTAINED FROM THE METHOD

RELATED APPLICATIONS

This application is a U.S. national stage entry under 35 U.S.C. § 371 of international patent application No. PCT/EP2020/065154 filed on Jun. 2, 2020, which claims priority to U.S. provisional patent application Ser. No. 62/864,040, filed on Jun. 20, 2019, and to European patent application Ser. No. 19/192,597.3, filed on Aug. 20, 2019, the whole content of each of these applications being explicitly incorporated herein by reference.

FIELD OF THE INVENTION

The present invention relates a method of making PEEK-PEoEK copolymers, PEEK-PEoEK copolymers obtained from the method, polymer compositions including the PEEK-PEoEK copolymers, shaped articles including the polymer compositions, and associated methods.

BACKGROUND

Poly(aryl ether ketone) polymers (PAEK), such as poly(ether ether ketone) polymers (PEEK) having -Ph-O-Ph-C(O)-Ph-O— characteristic unit (with -Ph- being a 1,4-phenylene group), are known for their high temperature performance and excellent chemical resistance; however, because of their melting temperatures ($T_m$) which are generally too high, their processing temperatures require costlier, energy-intensive processing. Their high melting temperatures ($T_m$) can also result in polymers being unstable during processing, especially when the polymers must be kept at a temperature above or just below their melting temperature for extended periods of time, such as in extrusion molding, injection molding and even in selective laser sintering processing.

Accordingly, a need exists for new PAEK polymers that can be reliably processed at lower temperatures, thanks to their lowered melting temperature, but which retain their technical properties, notably their chemical resistance and mechanical properties (when compared with conventional PAEK polymers), because retaining useful significant crystallinity fraction, delivering improved thermal resistance (with peak degradation temperatures exceeding 550° C.) and further possessing outstanding dielectric performances, including notably dissipation factor at 2.4 GHz of less than 0.0030, as required for use in advanced electronic parts.

Among approaches for addressing these conflicting requirements, use has been made of the introduction into poly(ether ether ketone) polymer structure of modifying monomers, having the effect of lowering melting point, while maintaining performances, as mentioned above.

Among these approaches, copolymers including PEDEK units of formula: -Ph-Ph-O-Ph-C(O)-Ph-, with -Ph- being a 1,4-phenylene unit, have been widely described, although somehow lacking in mechanical properties.

Poly(aryl ether ketone) polymers comprising PEEK units and PEoEK units of formula —O-orthoPh-O-Ph-C(O)-Ph- (with -orthoPh- being a 1,2-phenylene unit; and -Ph- being a 1,4-phenylene unit) have been already described in the art. For instance, JP1221426 describes notably copolymers of PEEK and PEoEK in its examples 5 and 6, manufactured from hydroquinone, cathecol and difluorobenzophenone, as allegedly possessing increased glass transition temperature, and simultaneously excellent heat resistance; nonetheless, the comparative examples collected by the Applicant in re-working the teachings of JP1221426 have shown that the copolymers manufactured as taught in JP1221426 were still failing in terms of thermal resistance, possessing peak degradation temperatures of lower than 550° C. and having regards to their dielectric performances, with dissipation factors at 2.4 GHz of exceeding 0.0031.

Similarly, A. Ben-Haida et al. in *Macromolecules*, 2006, 39, 6467-6472 describe 50/50 and 70/30 copolymers of PEEK and PEoEK manufactured by step-growth polycondensation of hydroquinone and catechol with 4,4'-difluorobenzophenone in diphenyl sulfone. Similarly as above, the comparative example collected by the Applicant in re-working the teachings of this scientific paper has shown that the copolymers manufactured as taught therein was still failing in terms of thermal resistance, possessing peak degradation temperatures of lower than 550° C. and low melt stability, and having regards to their dielectric performances, with dissipation factors at 2.4 GHz of exceeding 0.0037.

There still a shortfall in the art for PEEK-PEoEK copolymers possessing the above described combination of advantageous features, i.e. reduced melting point over PEEK materials, and increased crystallinity delivering outstanding mechanical properties, combined with improved thermal stability and dielectric performances.

DETAILED DESCRIPTION OF PREFERRED EMBODIMENTS

Figure 1:
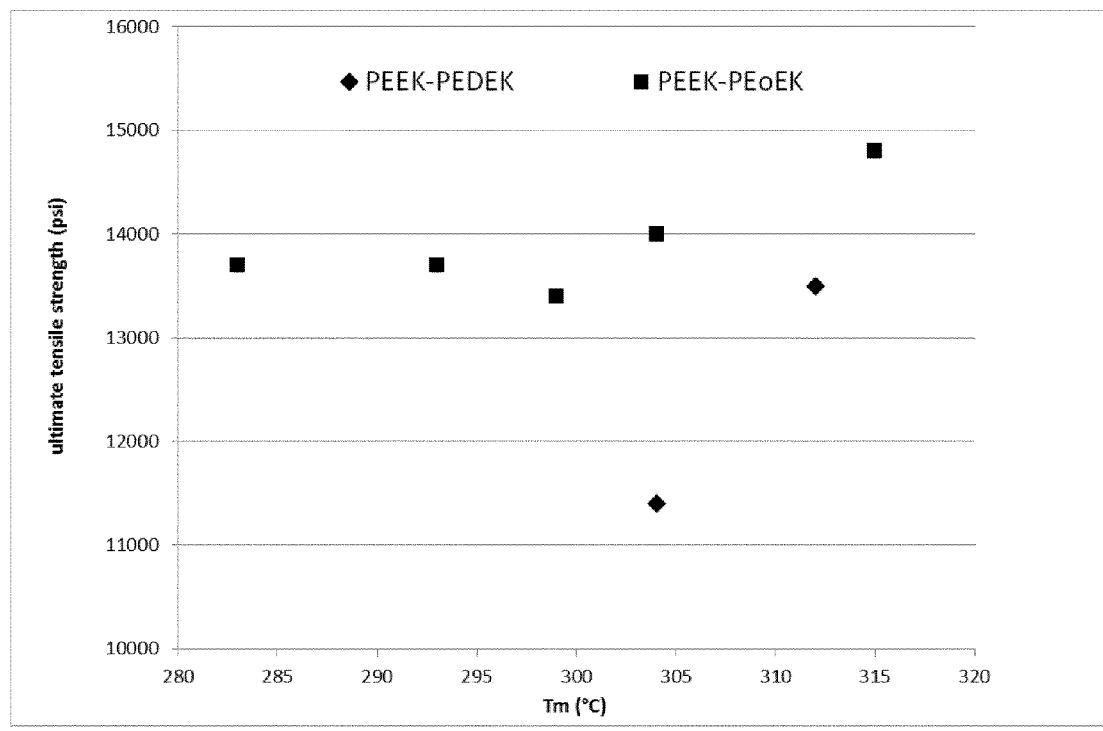
FIG. 1 is a plot based on the data in Table 6 comparing the tensile strengths of PEEK-PEDEK and PEEK-PEoEK copolymers at various melting temperatures (Tm).
Figure 2:
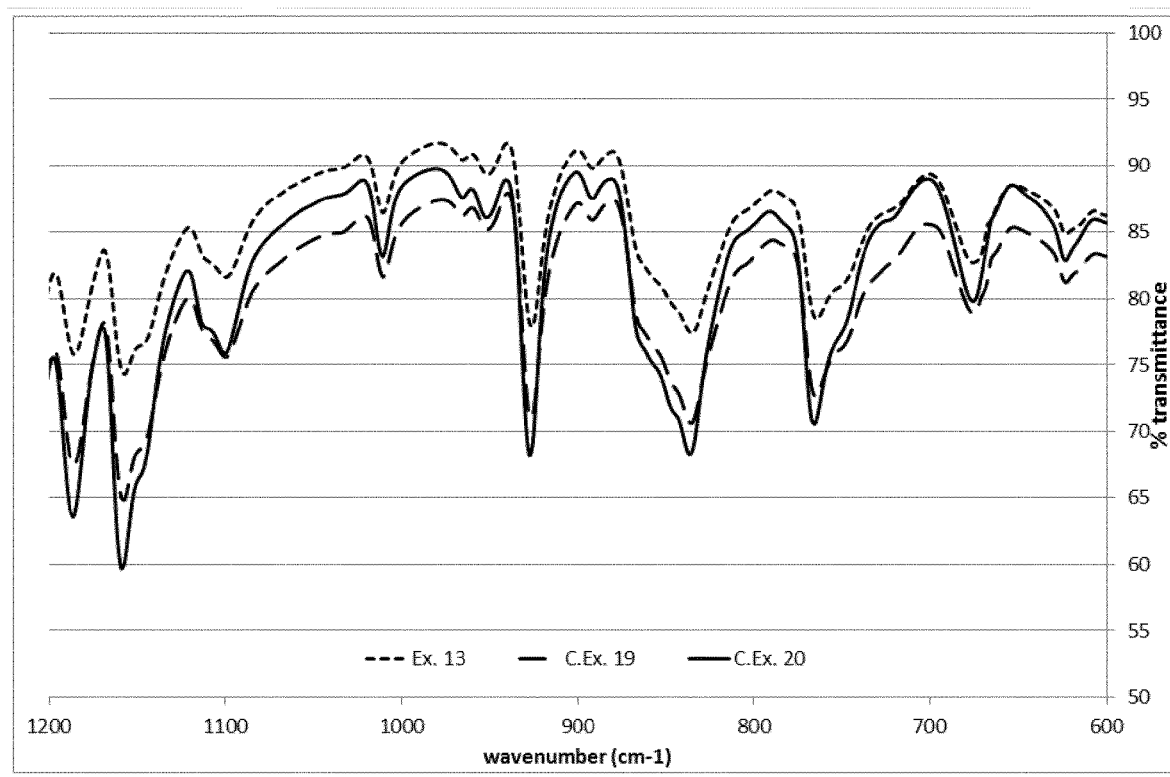
FIG. 2 represents FTIR spectra showing differences in the 600-1,000 $cm^{-1}$ spectral region for a PEEK-PEoEK copolymer of Ex. 13 (square dotted line) according to the invention and for comparative PEEK-PEoEK copolymers of C. Ex. 19 (solid line) and C. Ex. 20 (long dashed line).

In a first aspect, the present invention relates to a PEEK-PEoEK copolymer possessing a specific microstructure (including monomers' concatenation, end groups and defects), which is characterized by specific spectroscopic features, in particular specific ratios of absorbance of peaks at determined wavelength when analyzed by FT-IR-ATR on a powder specimen, delivering improved properties. The PEEK-PEoEK copolymer of the present invention is notably defined by its microstructure, as characterized by FT-IR absorbance ratios and calcium content, resulting from the (poly)condensation method described below. The present invention also alternatively relates to the PEEK-PEoEK copolymer obtainable by such (poly)condensation method.

In further aspects, the present invention relates to a method of making the PEEK-PEoEK copolymer having $R_{PEEK}$ and $R_{PEoEK}$ repeat units in a molar ratio $R_{PEEK}/R_{PEoEK}$ ranging from 95/5 to 70/30, a polymer composition including the PEEK-PEoEK copolymer and at least one reinforcing filler, at least one additive, or a combination thereof. Also described are methods of making the polymer composition, and shaped articles including the polymer composition.

More particularly, the invention pertains to a PEEK-PEoEK copolymer comprising at least 50 mol %, collectively, of repeat units ($R_{PEEK}$) and repeat units ($R_{PEoEK}$), relative to the total number of repeat units in the PEEK-PEoEK copolymer, wherein:

(a) repeat units ($R_{PEEK}$) are repeat units of formula (A):

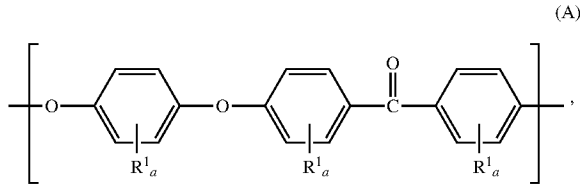

(A)

and (b) repeat units ($R_{PEoEK}$) are repeat units of formula (B):

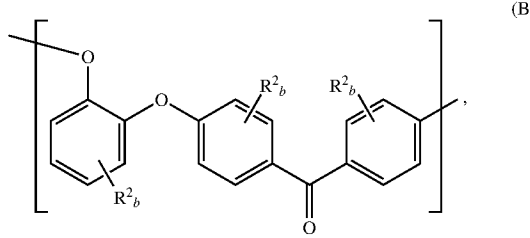

(B)

wherein:

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, and the PEEK-PEoEK copolymer comprises the repeat units $R_{PEEK}$ and $R_{PEoEK}$ in a molar ratio $R_{PEEK}/R_{PEoEk}$ ranging from 95/5 to 70/30, and the PEEK-PEoEK copolymer possesses a microstructure such that its FT-IR spectrum, when recorded between 600 and 1,000 $cm^{-1}$ in ATR mode on copolymer powder, is such that the following inequalities are satisfied:

(i)

$$\frac{A_{700 cm^{-1}}}{A_{704 cm^{-1}}} \leq 0.99,$$

wherein $A_{700\ cm^{-1}}$ is the of absorbance at 700 $cm^{-1}$ and $A_{704\ cm^{-1}}$ is the absorbance at 704 $cm^{-1}$;

(ii)

$$\frac{A_{816 cm^{-1}}}{A_{835 cm^{-1}}} \geq 0.61,$$

wherein $A_{816\ cm^{-1}}$ is the of absorbance at 816 $cm^{-1}$ and $A_{835\ cm^{-1}}$ is the absorbance at 835 $cm^{-1}$;

(iii)

$$\frac{A_{623 cm^{-1}}}{A_{557 cm^{-1}}} \leq 1.60,$$

wherein $A_{623\ cm^{-1}}$ is the of absorbance at 623 $cm^{-1}$ and $A_{557\ cm^{-1}}$ is the absorbance at 557 $cm^{-1}$;

(iv)

$$\frac{A_{928 cm^{-1}}}{A_{924 cm^{-1}}} \leq 1.09,$$

wherein $A_{926\ cm^{-1}}$ is the of absorbance at 928 $cm^{-1}$ and $A_{924\ cm^{-1}}$ is the absorbance at 924 $cm^{-1}$; and the PEEK-PEoEK copolymer has a Calcium (Ca) content of less than 5 ppm, when measured by Inductively Coupled Plasma Optical Emission Spectrometry (ICP-OES), calibrated with standards of known calcium content.

The Applicant has surprisingly found that solely the PEEK-PEoEK copolymers of the present invention, possessing the peculiar microstructure and residual Ca concentration such to comply with the above-listed spectral and analytical requirements, are able to deliver the particularly advantageous combination of properties mentioned above, i.e. reduced melting point (enabling lower temperature processing), outstanding mechanical properties, thermal stability (with peak degradation temperatures of 550° C. or beyond), and dielectric properties (with dissipation factor at 2.4 GHz of less than 0.0030).

The PEEK-PEoEK copolymers of the present invention are manufactured by a specific method which is another object of the present invention and which comprises the condensation of at least one difluoro-compound with a mixture of at least two di-hydroxy compounds, in a solvent comprising diphenylsulfone as the condensation solvent, whereas the polycondensation is terminated (or stopped) using at least one end-capping agent, followed by a specific work-up sequence.

The invention pertains to a method of making a PEEK-PEoEK copolymer, as described above, comprising:

causing at least one difluoro-compound of formula (C):

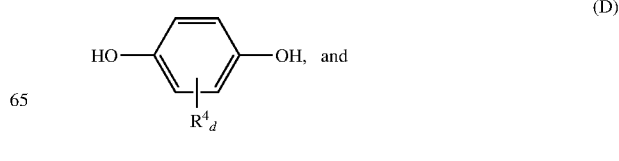

(C)

to react via (poly)condensation with a mixture of di-hydroxy compounds of formulas (D) and (E):

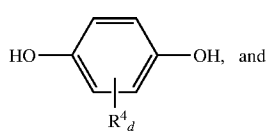

(D)

-continued

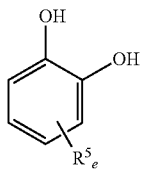
(E)

in a molar ratio (D)/(E) ranging from 95/5 to 70/30,
wherein each $R^3$, $R^4$, and $R^5$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each c, d, and e is independently selected from the group consisting of integers ranging from 0 to 4, at a temperature of 130 to 340° C., in the presence of a base, such as, for example, $Na_2CO_3$, $K_2CO_3$, or a combination thereof, in a polar organic solvent, preferably comprising diphenyl sulfone, so as to obtain a reaction mixture;

optionally, terminating the (poly)condensation reaction by reaction with a suitable agent, so as to obtain a product mixture; and recovering the PEEK-PEoEK copolymer, as described in details below.

The Applicant has surprisingly found that the specific method detailed above, possibly including a termination step of the polycondensation reaction through the use of an agent having termination effect, and including the above-detailed peculiar sequence of purification/separation steps, is material for achieving a PEEK-PEoEK copolymer possessing advantageous purity and microstructure, so as to deliver the sought combination of advantageous features mentioned above. The present invention also relates to the PEEK-PEoEK copolymer obtained by such specific method.

PEEK-PEoEK Copolymer

As used herein, a "PEEK-PEoEK copolymer" comprises at least 50 mol. %, collectively, of repeat units ($R_{PEEK}$) and repeat units ($R_{PEoEk}$), relative to the total number of moles of repeat units in the PEEK-PEoEK copolymer. In some embodiments, the PEEK-PEoEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEoEK}$), relative to the total number of moles of repeat units in the PEEK-PEoEK copolymer.

Repeat unit ($R_{PEEK}$) is represented by formula (A):

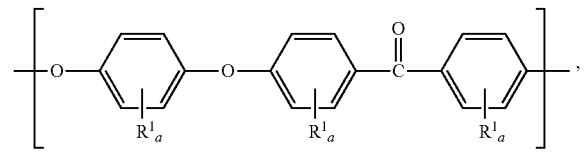
(A)

and repeat unit ($R_{PEoEK}$) is represented by formula (B):

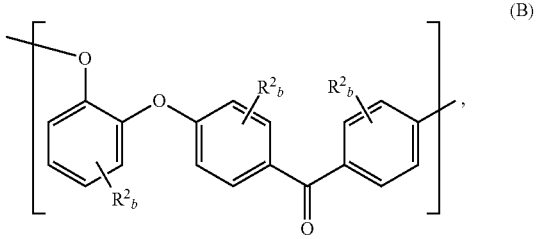
(B)

where each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
each a and b is independently selected from the group consisting of integers ranging from 0 to 4.

In some preferred embodiments, each a is zero, such that the repeat units ($R_{PEEK}$) are repeat units of formula (A-1):

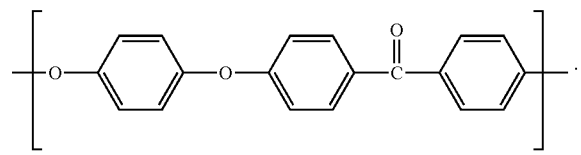
(A-1)

In some preferred embodiments, each b is zero, such that the repeat units ($R_{PEoEK}$) are repeat units of formula (B-1):

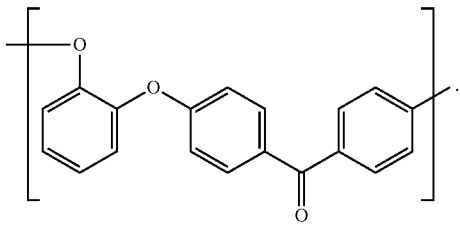
(B-1)

Preferably, repeat units ($R_{PEEK}$) are repeat units of formula (A-1), and repeat units ($R_{PEoEK}$) are repeat units of formula (B-1).

The PEEK-PEoEK copolymer of the present invention may additionally comprise repeat units ($R_{PAEK}$) different from repeat units ($R_{PEEK}$) and ($R_{PEoEK}$), as above detailed. In such case, the amount of repeat units ($R_{PAEK}$) can be comprised between 0.1 and less than 50 mol. %, preferably less than 10 mol. %, more preferably less than 5 mol. %, most preferably less than 2 mol. %, with respect to the total number of moles of repeat units of PEEK-PEoEK copolymer.

When repeat units ($R_{PAEK}$) different from repeat units ($R_{PEEK}$) and ($R_{PEoEK}$) are present in the PEEK-PEoEK copolymer of the present invention, these repeat units ($R_{PAEK}$) distinct from units units ($R_{PEEK}$) and ($R_{PEoEK}$), as described above, generally comply with any of the following formulae (K-A) to (K-M) herein below:

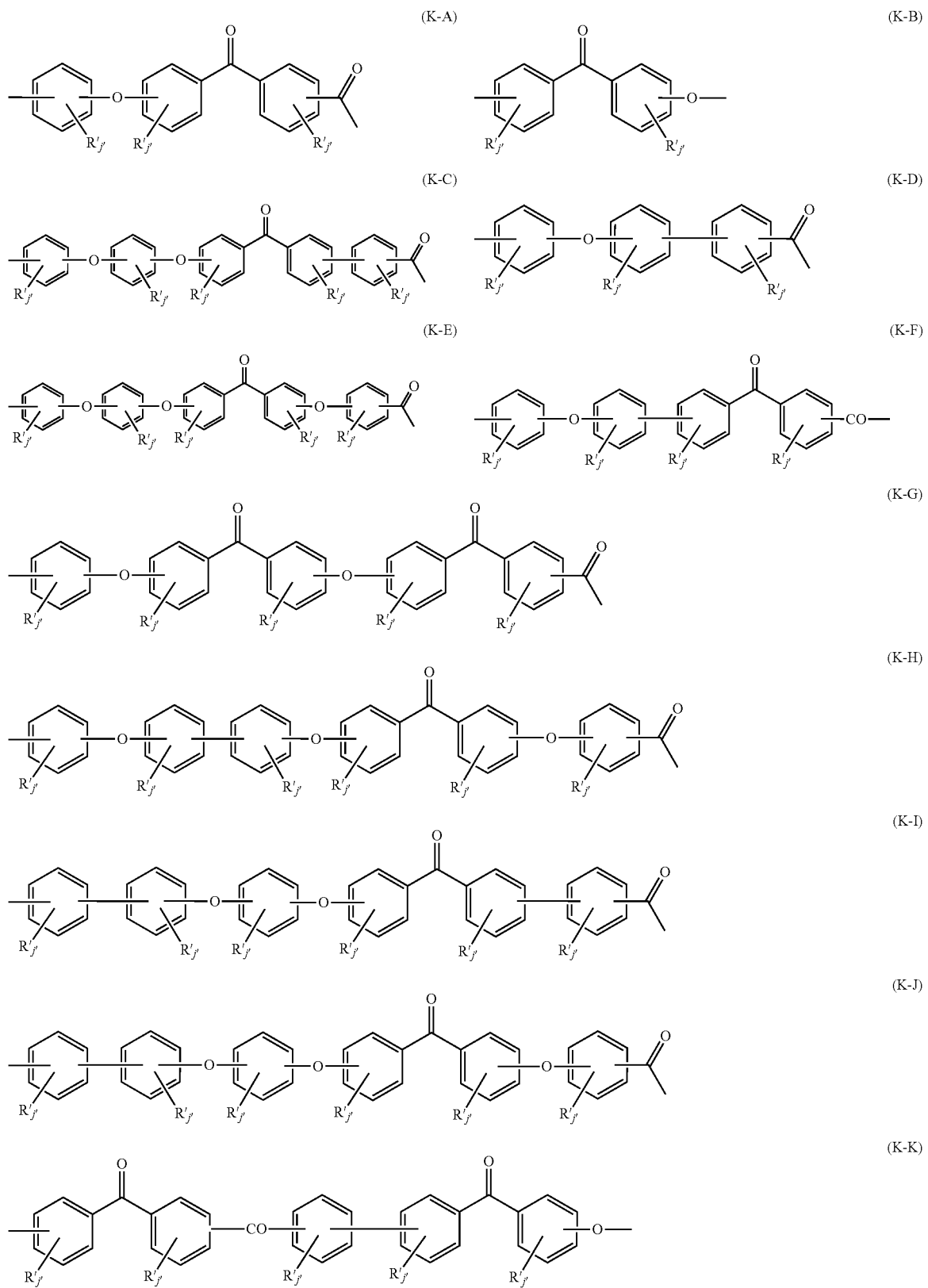

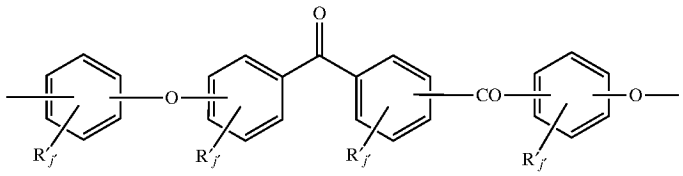

(K-L)

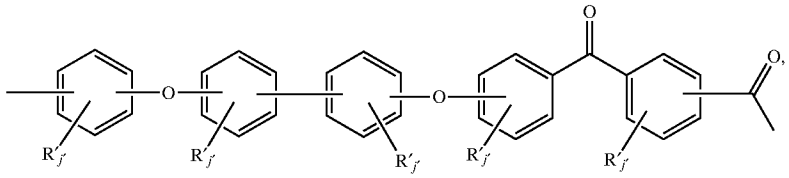

(K-M)

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEoEK copolymer of the present invention to be essentially composed of repeat units $(R_{PEEK})^{and}$ $(R_{PEoEK})$, as above detailed. In some preferred embodiments, the PEEK-PEoEK copolymer consists essentially of repeat units $R_{PEEK}$ and $R_{PEoEK}$. As used herein, the expression "consists essentially of repeat units $R_{PEEK}$ and $R_{PEoEK}$" means that any additional repeat unit different from repeat units $R_{PEEK}$ and $R_{PEoEK}$, as above detailed, may be present in the PEEK-PEoEK copolymer in amount of at most 2 mol. %, at most 1 mol. % or at most 0.5 mol. %, relative to the total number of moles of repeat units in the PEEK-PEoEK copolymer, and so as not to substantially alter the advantageous properties of the PEEK-PEoEK copolymer.

Repeat units $R_{PEEK}$ and $R_{PEoEK}$ are present in the PEEK-PEoEK copolymer in a $R_{PEEK}/R_{PEoEK}$ molar ratio ranging from 95/5 to 70/30, preferably from 90/10 to 72/28, more preferably between 85/15 and 74/26, such as in molar ratios of about 95/5, of about 90/10, of about 85/15, of about 80/20, of about 75/25 or of about 70/30.

The PEEK-PEoEK copolymer possesses a microstructure such that its FT-IR spectrum, when recorded between 600 and 1000 $cm^{-1}$ in ATR mode on copolymer powder, is such that the following inequalities are satisfied:

(i)
$$\frac{A_{700 cm^{-1}}}{A_{704 cm^{-1}}} \leq 0.99,$$

wherein $A_{700\ cm^{-1}}$ is the absorbance at 700 $cm^{-1}$ and $A_{704\ cm^{-1}}$ is the absorbance at 704 $cm^{-1}$;

(ii)
$$\frac{A_{816 cm^{-1}}}{A_{835 cm^{-1}}} \geq 0.61,$$

wherein $A_{816\ cm^{-1}}$ is the of absorbance at 816 $cm^{-1}$ and $A_{835\ cm^{-1}}$ is the absorbance at 835 $cm^{-1}$;

(iii)
$$\frac{A_{623 cm^{-1}}}{A_{557 cm^{-1}}} \leq 1.60,$$

wherein $A_{623\ cm^{-1}}$ is the of absorbance at 623 $cm^{-1}$ and $A_{557\ cm^{-1}}$ is the absorbance at 557 $cm^{-1}$;

(iv)
$$\frac{A_{928 cm^{-1}}}{A_{924 cm^{-1}}} \leq 1.09,$$

wherein $A_{928\ cm^{-1}}$ is the of absorbance at 928 $cm^{-1}$ and $A_{924\ cm^{-1}}$ is the absorbance at 924 $cm^{-1}$.

Spectral determinations for assessing the above listed parameters is made by Fourier transform (FT) infrared spectroscopy (IR) in Attenuated total reflection (ATR) mode, i.e. using an ATR accessory enabling determinations on neat PEEK-PEoEK copolymer powder, with no further preparation, which technique, as further specified in the examples, is particularly adapted for the spectral characterization of the PEEK-PEoEK copolymers of the invention.

The PEEK-PEoEK copolymer of the present invention is such that it has a Calcium (Ca) content of less than 5 ppm, as measured by Inductively Coupled Plasma Optical Emission Spectrometry (ICP-OES) calibrated with standards of known calcium content Preferably the PEEK-PEoEK copolymer has a Ca content of less than 4 ppm, less than 3 ppm or even more preferably less than 2.5 ppm.

In some embodiments, the PEEK-PEoEK copolymer of the present invention is such that it has a Sodium (Na) content of less than 1,000 ppm, as measured by Inductively Coupled Plasma Optical Emission Spectrometry (ICP-OES) calibrated with standards of known sodium content. Preferably, the PEEK-PEoEK copolymer has a sodium content of less than 900 ppm, less than 800 ppm or even more preferably less than 500 ppm.

In some embodiments, the PEEK-PEoEK copolymer of the present invention is such that it has a Sodium (Na) content of more than 1 ppm, as measured by ICP-OES, as described above.

In some embodiments, the PEEK-PEoEK copolymer of the present invention is such that it has a Phosphorus (P)

content of at least 6 ppm, as measured by Inductively Coupled Plasma Optical Emission Spectrometry (ICP-OES) calibrated with standards of known phosphorus content. Preferably, the PEEK-PEoEK copolymer has a phosphorous content of at least 10 ppm, at least 15 ppm or even more preferably at least 20 ppm.

In some embodiments, the PEEK-PEoEK copolymer of the present invention is such that it has a Phosphorus (P) content of more than 1 ppm, as measured by ICP-OES, as described above.

The thermal stability of the PEEK-PEoEK of the present invention is improved in comparison to the copolymers described in the prior art. The PEEK-PEoEK copolymers of the present invention preferably have a peak degradation temperature of at least 550° C., as measured TGA according to ASTM D3850, more preferably at least 551° C. and even more preferably at least 552° C.

The PEEK-PEoEK copolymer generally possesses a solubility of below 0.2% wt in N-methylpyrrolidone (NMP), N,N-dimethylacetamide (DMAc) and N,N-dimethylformamide (DMF), when determined at a temperature of 150° C. or less. In other terms, the PEEK-PEoEK copolymer of the invention is advantageously substantially insoluble in the above-listed solvents. It is noticeable mentioning that this is a further prominent feature differentiating the PEEK-PEoEK copolymers of the invention from those described by A. Ben-Haida et al. in the cited reference and in JP1221426, cited above.

The stability in the melt phase of the PEEK-PEoEK copolymer of the present invention is improved when compared over the melt stability of PEEK-PEoEK copolymers of the prior art. In particular, melt stability, when determined as a ratio between the melt viscosity determined after 40 minutes of dwell time at 410° under a shear rate of 46.3 s$^{-1}$ and the melt viscosity determined after 10 minutes of dwell time at same temperature and shear rate, wherein said melt viscosity is determined using a capillary rheometer according to ASTM D3835 standard using a conical die (diameter=1.016 mm, length=20.32 mm, cone angle=120°), is preferably of less than 1.23, preferably less than 1.22, more preferably less than 1.21.

In some embodiments, the PEEK-PEoEK copolymer has a melting temperature (Tm) of less than or equal to 340° C., preferably less than or equal to 335° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEoEK copolymer has as heat of fusion (ΔH) of at least 1 J/g, preferably at least 5 J/g, at least 10 J/g, at least 15 J/g, or at least 25 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some embodiments, the PEEK-PEoEK copolymer has as heat of fusion (ΔH) of at most 65 J/g, preferably at most 60 J/g.

In some embodiments, the PEEK-PEoEK copolymer exhibits a tensile modulus (Young Modulus) of at least 3.10 MPa (i.e 450 ksi), preferably at least 3.27 MPa (i.e. 475 ksi) as measured according to ASTM D638 at room temperature, on specimens compression molded as described in the examples.

In some embodiments, the PEEK-PEoEK copolymer exhibits a compressive strength of at least 103.4 kPa (i.e 15 ksi), preferably at least 110.3 kPa (i.e. 16 ksi) as measured according to ASTM D695 at room temperature, on injection-molded specimens after annealing, as described in the examples.

Depending upon the final performances which are required, it may be beneficial to select PEEK-PEoEK copolymer possessing units R$_{PEEK}$ and R$_{PEoEK}$ in a R$_{PEEK}$/R$_{PEoEK}$ molar ratio ranging from 95/5 to 80/20, when targeting PEEK-PEoEK copolymers possessing a melting temperature (Tm) of less than or equal to 340° C., preferably of less than or equal to 335° C., a heat of fusion of at least 10 J/g and a tensile modulus of at least 550 ksi as measured according to ASTM D638 at room temperature, on specimens compression molded as described in the examples.

In some other embodiments, it may be beneficial to select PEEK-PEoEK copolymer possessing units R$_{PEEK}$ and R$_{PEoEK}$ in a R$_{PEEK}$/R$_{PEoEK}$ molar ratio ranging from 80/20 to 70/30, when targeting PEEK-PEoEK copolymers possessing a melting temperature (Tm) of less than or equal to 310° C., preferably of less than or equal to 305° C., a heat of fusion of at least 3 J/g, and a tensile modulus of at least 475 ksi as measured according to ASTM D638 at room temperature.

In some embodiments, the PEEK-PEoEK copolymer has a glass transition temperature (Tg) of less than or equal to 165° C., preferably less than or equal to 160° C., less than or equal to 155° C., or less than or equal to 150° C. as measured in a differential scanning calorimeter (DSC) according to ASTM D3418-03 and E1356-03.

Depending upon the requirements, the PEEK-PEoEK of the invention may be manufactured with higher or lower molecular weight, so as to tune molten viscosity in a very wide range. In some embodiments, the PEEK-PEoEK copolymer may have a melt viscosity (MV) as measured according to ASTM D3835 at 410° C., 46.3 s$^{-1}$ of at least 0.02 kN/m$^2$, more preferably at least 0.04 kN/m$^2$ and most preferably at least 0.06 kN/m$^2$.

In some embodiments, the PEEK-PEoEK copolymer has a melt viscosity (MV) as measured according to ASTM D3835 at 410° C., 46.3 s$^{-1}$ of at most 5.0 kN/m$^2$, more preferably at most 3.0 kN/m$^2$, most preferably at most 2.5 kN/m$^2$, even most preferably at most 2.0 kN/m$^2$.

Generally, for complying with requirements of low viscosity processing, the PEEK-PEoEK copolymer may be provided with a melt viscosity (MV) as measured according to ASTM D3835 at 410° C., 46.3 s$^{-1}$ of preferably at least 0.03 kN/m$^2$ and preferably at most 0.60 kN/m$^2$.

Particularly beneficial for use in injection molding or fiber impregnation are PEEK-PEoEK copolymers having a melt viscosity (MV) as measured according to ASTM D3835 at 410° C., 46.3 s$^{-1}$ of preferably at least 0.05 kN/m$^2$ and preferably at most 0.35 kN/m$^2$ and most preferably of about 0.15 N/m$^2$.

Particularly beneficial for use in extrusion, compression molding and selective laser sintering are PEEK-PEoEK copolymers having a melt viscosity (MV) as measured according to ASTM D3835 at 410° C., 46.3 s$^{-1}$ of preferably at least 0.25 kN/m$^2$ and preferably at most 0.60 kN/m$^2$ and most preferably of about 0.35 kN/m$^2$.

Otherwise, for complying with requirements of high viscosity processing, the PEEK-PEoEK copolymer may be provided with a melt viscosity (MV) as measured according to ASTM D3835 at 410° C., 46.3 s$^{-1}$ of preferably at least 0.80 kN/m$^2$ and preferably at most 2.5 kN/m$^2$. Particularly beneficial for use in some extrusion applications are PEEK-PEoEK copolymers having a melt viscosity (MV) as measured according to ASTM D3835 at 410° C., 46.3 s$^{-1}$ of preferably at least 0.8 kN/m$^2$ and preferably at most 2.5 kN/m$^2$.

Particularly beneficial for use in some extrusion applications, are PEEK-PEoEK copolymers having a melt viscosity (MV) as measured according to ASTM D3835 at 410° C., 46.3 s$^{-1}$ of preferably at least 1.0 kN/m$^2$ and preferably at most 2.0 kN/m$^2$ and most preferably of at least 1.2 kN/m$^2$ and at most 1.4 kN/m$^2$.

Method of Making the PEEK-PEoEK Copolymer

The method of making a PEEK-PEoEK copolymer, as described above, comprises causing at least one difluoro-compound of formula (C):

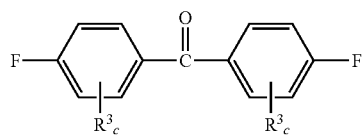

(C)

to react with a mixture comprising at least the di-hydroxy compounds of formulas (D) and (E):

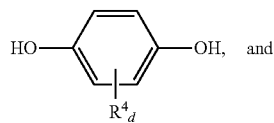

(D)

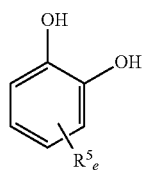

(E)

in a molar ratio (D)/(E) ranging from 95/5 to 70/30, wherein R$^3$, R$^4$, and R$^5$, have the meaning specified above. Each c, d, and e is independently selected from the group consisting of integers ranging from 0 to 4, in a polar organic solvent in the presence of a base, such as, for example, Na$_2$CO$_3$, K$_2$CO$_3$, or a combination thereof. Preferably each of c, d, and e is zero, which means that compounds (C), (D) and (E) are unsubstituted.

The method of the invention may comprise terminating the (poly)condensation reaction by reaction with at least one suitable agent; agents which may be used for terminating the polycondensation reaction include compounds which terminate chain growth by being incorporated in the polymer backbone via a condensation reaction (also referred to as end-capping agents) and compounds which terminate chain growth without being incorporated in the polymer backbone through a condensation reaction (also referred to as terminating agents).

End-capping agents used in the method of the present invention notably include those represented by formula (F) below:

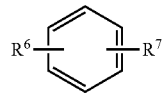

(F)

wherein
R$^6$ is F, Cl, or OH,
R$^7$ is —C(O)—Ar—R$^{10}$, —Ar—R$^{10}$, an alkyl (e.g. a C$_1$-C$_{10}$ alkyl or a C$_1$-C$_5$ alkyl) or —H, with Ar being an arylene group comprising at least one benzene ring (i.e. one benzene ring or several benzene rings), and with R$^{10}$ being F, Cl or H.

Preferably, R$^7$ is —C(O)—Ar—R$^{10}$, Ar—R$^{10}$ or H, with R$^{10}$ being F, Cl or H. According to certain preferred embodiments, R$^{10}$ is F.

Preferably, R$^6$ is F or OH. More preferably, R$^6$ is F.

When R$^7$ is different from —H, R$^6$ and R$^7$ may be 1,2- or ortho-substitution on the phenylene cycle of formula (F) or they may be 1,3- or meta-substitution on the phenylene cycle. Alternatively, R$^6$ and R$^7$ may preferably be 1,4- or para-substitution on the phenylene cycle of formula (F).

In some embodiments, the end-capping agent is selected from the group consisting of 4,4'-difluorobenzophenone, phenol, 4-phenoxyphenol, 4-phenylphenol, 4-fluorobenzophenone, 3-fluorobenzophenone, 2-fluorobenzophenone, 4,4'-dichlorodiphenylsulfone, 4,4' difluorodiphenylsulfone and a mixture thereof.

Difluoro-compounds and monofunctional phenols are preferably used as end-capping agents. In some embodiments, the end-capping agent is an excess of a difluoro-compound monomer. The end-capping agent used in the method of the present invention is preferably 4,4'-difluorobenzophenone, 4,4'-difluorobenzophenone, phenol, 4-phenoxyphenol, 4-phenylphenol or a mixture thereof.

Lithium chloride is one example of a terminating agent, which will terminate the reaction without being incorporated in the polymer backbone through condensation.

In some embodiments, the reaction is terminating with at least one end-capping agent and with at least one terminating agent other than an end-capping agent. Preferably, 4,4'-difluorobenzophenone and lithium chloride are respectively used as end-capping agent and terminating agent in the method of the present invention.

The (poly)condensation reaction may be carried out with a slight excess of difluoro-compound of formula (C); it is further understood that, when used, the end-capping agent may be added to the reaction mixture at the inception of the polycondensation; as a whole, hence, considering that an excess of monomer (C) may be used as end-capping agent, as explained above, the molar ratio [(C)+(F)]/[(D)+(E)] is ≥1.000, preferably ≥1.003, more preferably ≥1.006, even more preferably ≥1.010.

Preferably, the compound of formula (C) is 4,4'-difluorobenzophenone (DFBP). Preferably, the compound of formula (D) is hydroquinone. Preferably, the compound of formula (E) is catechol. In some embodiments, the compound of formula (C) is 4,4'-difluorobenzophenone (DFBP), the compound of formula (D) is hydroquinone, and the compound of formula (E) is catechol (also referred to as pyrocatechol).

The method of the present invention is conducted in a solvent preferably comprising diphenyl sulfone. In some embodiments, the solvent comprises at least 50 wt. % of diphenyl sulfone, based on the total weight of solvent in the reaction mixture, for example at least 60 wt. %, at least 70 wt. %, at least 80 wt. %, at least 90 wt. %, at least 95 wt. % or at least 98 wt. %, based on the total weight of solvent in the reaction mixture. In some embodiments, the solvent consists essentially in diphenyl sulfone. In the method of the present invention, a solvent comprising limited amounts of impurities, as detailed in U.S. Pat. No. 9,133,111 can be used.

The solvent of the present invention may comprise benzophenone and/or dibenzothiophene dioxide.

The method of the present invention is conducted in the presence of a base, for example selected from the group consisting of potassium carbonate ($K_2CO_3$), potassium bicarbonate, sodium carbonate ($Na_2CO_3$), cesium carbonate ($Cs_2CO_3$), potassium phosphate and sodium bicarbonate. The base acts to deprotonate the components (D) and (E) during the condensation reaction. The condensation is preferably carried out in the presence potassium carbonate ($K_2CO_3$), sodium carbonate ($Na_2CO_3$) or a mixture of both, most preferably a mixture of both.

In some embodiments, the step consisting in terminating the reaction comprises:
- adding a first end capping agent in the reaction mixture and
- adding a terminating agent in the reaction mixture, and
- optionally adding a second end capping agent in the reaction mixture, the second end capping agent being preferably identical to the first end capping agent.

In some other embodiments, the step consisting in terminating the reaction comprises:
- in a first step, adding 4,4'-difluorobenzophenone (DFBP) in the reaction mixture,
- in a second step, adding lithium chloride (LiCl) in the reaction mixture, and
- optionally in a third step adding 4,4'-difluorobenzophenone (DFBP) or lithium chloride (LiCl) in the reaction mixture, preferably 4,4'-difluorobenzophenone (DFBP).

In some embodiments, the at least one end-capping agent is added to the reaction mixture at the beginning of the reaction.

In some embodiments, the concentration of the monomers and end capping agents (when used) [(C)+(D)+(E)+(F)] in the diphenylsulfone is at least 20 wt. %, preferably at least 25 wt. %, more preferably at least 30 wt. %.

In some embodiments, the concentration of the monomers and end capping agents (when used) [(C)+(D)+(E)+(F)] in the diphenylsulfone is at most 48 wt. %, preferably at most 46 wt. %, more preferably at most 42 wt. %.

In some embodiments, the temperature of the reaction mixture is kept at a temperature of at least 130° C., preferably at least 140° C., more preferably at least 150° C., for about 0.5 to 15 hours.

It is also preferable that the compounds (C), (D) and (E) are heated in the method of the invention at a first temperature of at least 130° C., preferably at least 140° C., more preferably at least 150° C. before being contacted with the base, preferably $Na_2CO_3$ and/or $K_2CO_3$. The reaction mixture is then heated at a temperature of at least 260° C., preferably at least 280° C., at a temperature ramp rate of less than 5° C./minute, preferably less than 3° C./minute and/or at a temperature ramp rate of more than 0.1° C./minute. As described in the Examples, once the final target temperature is attained, the reaction is generally continued for a limited time at this temperature, before being terminated.

The reaction mixture is polycondensed, within the temperature range, until the requisite degree of condensation is reached. The polycondensation time can be from 0.1 to 10 hours, preferably from 0.2 to 4 or from 0.5 to 3 hours, depending on the nature of the starting monomers and on the selected reaction conditions.

After (poly)condensation, the copolymer is recovered.

The solvent and the inorganic constituents, for example sodium fluoride or potassium fluoride or excess of base, can be removed by suitable methods such as dissolving and filtering, screening or extracting. This is generally achieved through steps (a) to (d) and (e) to (g) or (e') to (g').

Once a solid phase is isolated in step (a), the solid phase may be first exposed to at least one of comminution, pulverizing, and triturating, so as to be provided under the form of small particles. Generally, the solid phase is ground under the form of a powder.

In step (b), the solid phase comprising the PEEK-PEoEK copolymer is contacted with a solvent having a normal boiling point of less than 100° C.; this solvent having a normal boiling point (i.e. a boiling point under normal pressure, i.e. under a pressure of 1 atm) of less than 100° C. can be selected among polar organic solvents, in particular solvents possessing at least one carbonyl group and/or at least one hydroxyl group. Low boiling point ketones and alcohols are exemplary embodiment's thereof; preferred solvents used in step (b) are those selected from the group consisting of acetone, methyl ethyl ketone, ethanol, methanol, isopropanol, which may be used singly or in admixture.

In optional step (c), use is made of demineralized water. Methods for providing demineralized water are well-known and their choice is not critical. To the extent demineralized water is used, it generally possesses an overall Na and Ca concentration of less than 30 ppm, preferably less than 25 ppm, more preferably less than 20 ppm.

In step (d), the solid residue (1), comprising the PEEK-PEoEK copolymer, is contacted with an aqueous solution of a protic acid having a pKa of at most 6, preferably at most 4, most preferably at most 3. The choice of the said protic acid is not particular critical, provided it complies with the mentioned pKa requirements. Hydrochloric acid, oxalic acid, phosphoric acid, acetic acid, formic acid, and mixtures thereof may be used as suitable protic acids in this step. Preferably the protic acid is at least one of hydrochloric acid, oxalic acid or phosphoric acid. It is nonetheless understood that HCl is a preferred acid to be used in this step.

Optional steps (e) or step (f) are carried out by contacting with a solvent having a normal boiling point of less than 100° C.; features described above in connection with solvent used in step (b) are equally applicable for the selection of solvent used in steps (e) or (f). Further, while different solvents may be used in step (b) and steps (e) or (f), it may be convenient to make use of same solvent in both steps, i.e. in steps (b) and (e) or (b) and (f).

Steps (f) and (e') require the use of an aqueous buffer solution, having a pH comprised between 6.0 and 7.0; while organic buffering agents may be used, it is generally preferred to make use of a phosphate-based buffering system. In the steps (f) and (e'), the PEEK-PEoEK copolymer, is preferably performed with an aqueous buffer solution of at least one of sodium dihydrogen phosphate ($NaH_2PO_4$) and disodium hydrogen phosphate ($Na_2HPO_4$). Preferably, the the PEEK-PEoEK copolymer is contacted with a solution including both $NaH_2PO_4$ and $Na_2HPO_4$. The phosphate salts used of the solutions used hereby can for example be anhydrous, monohydrate, dihydrate or heptahydrate.

The concentration of the $NaH_2PO_4$ in the aqueous buffer solution is not particularly limited, provided that the requested buffering effect is achieved. Further, it is generally preferred for $NaH_2PO_4$ concentration to be sufficient in order for the copolymer to preferably present a phosphorus content of more than 20 ppm. In other terms, the amount of $NaH_2PO_4$ in the buffer solution is preferably chosen to match the preferred minimal 20 ppm amount of phosphorus atoms attached to the copolymer. The concentration of $NaH_2PO_4$ in the solution is preferably at least 0.002 wt. %, more preferably at least 0.004 wt. %, most preferably at least 0.006 wt. %, most preferably at least 0.01 wt. %. The concentration of $NaH_2PO_4$ in the solution is preferably at most 0.30 wt. %, more preferably at most 0.20 wt. %, most preferably at most 0.10 wt. %, most preferably at most 0.05 wt. %. The concentration of $Na_2HPO_4$ in the solution is preferably at least 0.002 wt. %, more preferably at least 0.004 wt. %, most preferably at least 0.006 wt. %, most preferably at least 0.02 wt. %. The concentration of $Na_{2H}PO_4$ in the solution is preferably at most 0.30 wt. %, more preferably at most 0.20 wt. %, most preferably at most 0.10 wt. %, most preferably at most 0.05 wt. %.

In steps (f) and (e'), the PEEK-PEoEK copolymer is advantageously submitted to washing with the said aqueous buffering solution, in particular the dihydrogen phosphate ($NaH_2PO_4$) and disodium hydrogen phosphate ($Na_2HPO_4$) solution. As used herein, "washing" the copolymer with a solution including at least one of sodium dihydrogen phosphate ($NaH_2PO_4$) and disodium hydrogen phosphate ($Na_2HPO_4$) may involve substantially fixing phosphate groups on the copolymer. "Substantially fixing" means that the PEEK-PEoEK polymer preferably retains a phosphorus content of more than 20 ppm, as determined by Inductively Coupled Plasma Optical Emission Spectrometry (ICP-OES), for example more than 30 ppm, more than 40 ppm, more than 50 ppm or more than 60 ppm.

Optionally, between steps (d) and (e) and/or between steps (e) and (f), the residual solid is contacted with demineralized water at a temperature between 15 to 100° C., preferably between 15 to 40° C., and separating a residual solid from said demineralized water.

The recovery part of the method of the present invention may comprise more than one washing cycles. According to this embodiment, steps (b) to (f), with optional washings with demineralized water between steps (d) and (e) and/or between steps (e) and (f), are optionally repeated multiple times. According to this embodiment also, steps (b) to (d), (e') and (f), are optionally repeated multiple times.

In some embodiments, the copolymer is contacted with the aqueous buffer solution for a time ranging from 5 minutes to 5 hours, preferably from 10 minutes to 3 hours. Methods of washing polymers are well known to those of skill in the art, and include, for example, slurrying the polymer with the solution including the acid or base, as defined below, and then filtering off the solution.

Step (g) or (g') comprise drying the residual solid (3'), (4) or (4'), for obtaining the PEEK-PEoEK copolymer of the present invention. In this step, drying is generally carried out at a temperature of at least 95° C., for example at least 100° C., for at least one hour, for example at least 2 hours, at least 5 hours, at least 10 hours or 12 hours.

The present invention also relates to a PEEK-PEoEK copolymer obtainable by such method described above (product-by-process). As described above, such copolymer can be characterized by comprising at least 50 mol. %, collectively, of repeat units ($R_{PEEK}$) and repeat units ($R_{PEoEK}$), relative to the total number of moles of repeat units in the PEEK-PEoEK copolymer, wherein:

(a) repeat units ($R_{PEEK}$) are repeat units of formula (A):

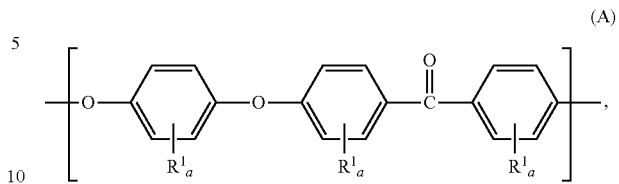

(A)

and
(b) repeat units ($R_{PEoEk}$) are repeat units of formula (B):

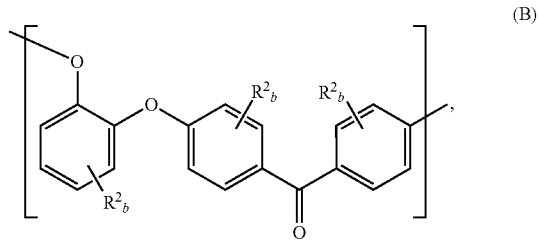

(B)

wherein:
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4, and
the PEEK-PEoEK copolymer comprises the repeat units $R_{PEEK}$ and $R_{PEoEK}$ in a molar ratio $R_{PEEK}/R_{PEoEK}$ ranging from 95/5 to 70/30

The Polymer Composition

The PEEK-PEoEK copolymer can be desirably incorporated into polymer compositions. The polymer composition includes the PEEK-PEoEK copolymer and at least one of a reinforcing filler, as described below, or at least one additive, different from the reinforcing filler as described below, or a combination thereof. The polymer composition comprises at least 10 wt. %, at least 20 wt. %, at least 30 wt. % of the polymer composition, based on the total weight of the polymer composition. In some embodiments, the polymer composition comprises at least 50 wt. % of PEEK-PEoEK copolymer of the present invention, preferably at least 60 wt. %, at least 70 wt. %, at least 80 wt. %, at least 90 wt. %, at least 95 wt. %, at least 99 wt. % of the PEEK-PEoEK copolymer, based on the total weight of the polymer composition. In some embodiments, the polymer composition comprises less than 50 wt. %, preferably less than 45 wt. %, more preferably less than 40 wt. % of the PEEK-PEoEK copolymer, based on the total weight of the polymer composition.

Reinforcing Fillers

In some embodiments, the polymer composition includes at least one reinforcing filler. Reinforcing fillers are well known to those of skill in the art. They are preferably selected from fibrous and particulate fillers different from the pigments as described below. More preferably, the reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc. Nano-scale reinforcing fillers can also be used. These fillers include: single and multi-wall carbon nanotubes, carbon nanofibers, graphene, graphene oxide, and nanoclays such as montmorillonite. Still more preferably, it is selected from mica, kaolin, calcium silicate, magnesium carbonate, glass fiber, carbon fibers and wollastonite.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition may have a circular cross-section or a non-circular cross-section (such as an oval or rectangular cross-section). When the glass fibers used have a circular cross-section, they preferably have an average glass fiber diameter of 3 to 30 µm and particularly preferred of 5 to 12 µm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, the polymer composition includes at least one carbon fiber. As used herein, the term "carbon fiber" is intended to include graphitized, partially graphitized, and ungraphitized carbon reinforcing fibers or a mixture thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

The reinforcing fibers may be organic or inorganic. Suitable fibers for use as the reinforcing fiber component include, for example, carbon fibers, graphite fibers, glass fibers, such as E glass fibers, ceramic fibers, such as silicon carbide fibers, synthetic polymer fibers, such as aromatic polyamide fibers, polyimide fibers and polybenzoxazole fibers. The areal weight of a single layer or cross section of such fibers can vary, for example, from 50 to 600 $g/m^2$.

In some embodiments, the fibers comprise carbon fibers, glass fibers, or both carbon fibers and glass fibers. In some embodiments, the fibers comprise carbon fibers, including, for example, carbon fibers that exhibit a tensile strength of greater than or equal to 3.5 GigaPascals ("GPa") and a tensile modulus of greater than or equal to 200 GPa, as measured by ASTM D638.

The fibers may be in the form of whiskers, short fibers, continuous fibers, sheets, plies, and combinations thereof. Continuous fibers may further adopt any of unidirectional, multi-dimensional, non-woven, woven, knitted, stitched, wound, and braided configurations, as well as swirl mat, felt mat, and chopped mat structures. The fiber tows may be held in position in such configurations by cross-tow stitches, weft-insertion knitting stitches, or a small amount of resin, such as a sizing. As used herein "continuous fibers" are fibers having a length greater than 10 mm.

In some embodiments, the polymer composition comprises less than 60 wt. %, more preferably less than 50 wt. %, even more preferably less than 45 wt. %, most preferably less than 35 wt. % of reinforcing filler, based on the total weight of the polymer composition.

In some embodiments, the polymer composition comprises at least 10 wt. %, preferably at least 20 wt. %, preferably at least 25%, most preferably at least 30 wt. % of reinforcing filler, based on the total weight of the polymer composition.

Additives

In some embodiments, the polymer composition comprises at least one additive different from the reinforcing filler and from the PEEK-PEoEK copolymer, as above detailed, generally selected from the group consisting of (i) colorants such as a dye (ii) pigments such as titanium dioxide, zinc sulfide and zinc oxide (iii) light stabilizers, e.g. UV stabilizers (iv) heat stabilizers (v) antioxidants such as organic phosphites and phosphonites, (vi) acid scavengers (vii) processing aids (viii) nucleating agents (ix) internal lubricants and/or external lubricants (x) flame retardants (xi) smoke-suppressing agents (x) anti-static agents (xi) anti-blocking agents (xii) conductivity additives such as carbon black and carbon nanofibrils (xiii) plasticizers (xiv) flow modifiers (xv) extenders, and (xvi) metal deactivators.

In some embodiments, the polymer composition includes less than 20%, preferably less than 10%, more preferably less than 5% and even more preferably less than 2% of additives.

In some embodiments, the polymer composition comprises as an additive 40 wt. % or less of at least one poly(aryl ether sulfone) (PAES) selected from the group consisting of a polysulfone (PSU), a polyphenylsulfone (PPSU), and a poly(ether sulfone) (PES), based on total weight of the polymer composition.

In alternative embodiments, the PEEK-PEoEK copolymer, as above detailed, is the only polymeric component in the polymer composition. As used herein, the expression "polymeric component" means a compound having repeat units and a molecular weight of at least 2,000 g/mol. In some embodiments, the polymer composition includes less than 3 wt. %, 2 wt. %, 1 wt. %, 0.5 wt. % of a polymeric component other than the PEEK-PEoEK copolymer.

Methods of Making the Polymer Composition

The polymer composition can be prepared by a variety of methods involving intimate admixing of the components of the polymer composition, for example by dry blending, suspension or slurry mixing, solution mixing, melt mixing or a combination of dry blending and melt mixing. As used herein, the "components of the polymer composition" includes the PEEK-PEoEK copolymer, as above detailed, and at least one of the at least one reinforcing filler, the at least one additive, and of a combination thereof.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurrying the components of the polymer composition using an agitator in an appropriate liquid, such as, for example, methanol, followed by filtering the liquid away, to obtain a powder mixture of the components of the polymer composition.

The solution mixing of the components of the polymer composition can be carried out by mixing the components with an agitator in at least one solvent such as, for example, diphenylsulfone, benzophenone, 4-chlorophenol, 2-chlorophenol, or meta-cresol.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

Shaped Articles and Methods of Making

Exemplary embodiments also include shaped articles comprising the above-described polymer composition and methods of making the shaped articles.

The shaped article can include one or more parts. When the shaped article is a single part, the single part preferably consists of the polymer composition.

Alternatively, the shaped article may consist of more than one part, one or more of which preferably consists of the polymer composition. When more than one part of the shaped article includes the polymer composition, each part may include the same polymer composition or a different polymer composition as described herein.

The weight of the polymer composition, based on the total weight of shaped article, is preferably greater than 1%, greater than 5%, greater than 10%, preferably greater than 15%, greater than 20%, greater than 30%, greater than 40%, greater than 50%, greater than 60%, greater than 70%, greater than 80%, greater than 90%, greater than 95%, greater than 99%.

The polymer composition may be well suited for the manufacture of articles useful in a wide variety of applications. For example, the surprising and advantageous properties of the PEEK-PEoEK copolymer described herein makes the polymer composition especially suitable for use in automotive applications such as magnet wire coatings in hybrid and electric vehicles, oil and gas applications such as downhole cable coatings, structural components for mobile electronic devices (e.g., framework or housing), thermoplastic composites for structural and transportation applications, electrostatic powder coatings on metal substrates for corrosion protection and abrasion resistance, and parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons.

In particular, the polymer composition is very well suited for use as a coating for wires or cables, as a structural part of a mobile electronic devices, or as a part produced by additive manufacturing. Thus, exemplary embodiments also include shaped articles made, at least in part, by the additive manufacturing methods described below using the polymer composition described above. Such shaped articles can be used in a variety of final applications such as implantable medical devices, dental prostheses, and brackets and complex shaped parts in the aerospace and automotive industries.

In particular, the polymer composition is well-suited for use as continuous fiber reinforced composite.

Methods of Making the Shaped Articles

The shaped articles described herein can be made from the polymer composition by injection molding, extrusion molding, compression molding, additive manufacturing (also called three-dimensional (3D) printing, for which the shaped articles may also be called 3D objects or 3D parts), continuous fiber impregnation, and continuous fiber composite lamination/consolidation or other shaping technologies.

In some embodiments, the method of making the shaped article or part thereof includes a step of compression molding or injection molding, and subsequent solidification of the polymer composition.

In some embodiments, the method for making the shaped article or shaped article or part thereof includes a step of coating. For example, the polymer composition can be applied to a wire as a coating by any suitable coating method, preferably by extrusion coating around a wire to form a coated wire, preferably a coated magnet wire.

Exemplary embodiments are also directed to methods of making shaped articles by additive manufacturing, where the shaped article is printed from the polymer composition, also called "part material". The methods include printing layers of the shaped article from the polymer composition as described below. The expression "part material" hereby refers to a polymeric composition comprising at least the PEEK-PEoEK copolymer, and intended to form at least a part of the 3D object. The part material is according to the present invention used as feedstocks to be used for the manufacture of shaped articles, 3D objects or part of 3D objects.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF), also known as Fused Deposition Modelling (FDM). Pellet Additive Manufacturing (PAM) is an example of a 3D printing method capable of printing raw materials as pellets.

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermoplastic (FRTP) printing method. This method is based on fused-deposition modeling (FDM) and prints a combination of fibers and resin.

The advantageous properties of the polymer composition discussed above make the polymer composition particularly suitable for additive manufacturing applications.

Accordingly, some embodiments include a method of making a shaped article comprising printing layers of the polymer composition to form the shaped article by an extrusion-based additive manufacturing system (for example FFF or PAM), a powder-based additive manufacturing system (for example SLS), or a continuous Fiber-Reinforced Thermoplastic (FRTP) printing method.

In some embodiments, the 3D printing method employs the copolymers as main elements of the part material, which can for example be shaped in the form of filaments or microparticles (with a regular shape such as spheres, or with a complex shape obtained by grinding/milling of pellets), to build a 3D object (e.g. a 3D model, a 3D article or a 3D part). The polymers may also be printed in the form of pellets.

Some embodiments include a filament including the polymer composition. Preferably, the filament is suitable for use in additive manufacturing methods as described above, such as FFF or FDM.

The term "filament" refers to a thread-like object or fiber including the polymer composition. The filament may have a cylindrical or substantially cylindrical geometry, or may have a non-cylindrical geometry, such as a ribbon-shaped filament. The filament may be hollow, or may have a core-shell geometry, with a different polymer composition comprising either the core or the shell.

When the filament has a cylindrical geometry, the diameter of the cross-section of the fiber preferably ranges from 0.5 to 5 mm, preferably from 0.8 to 4 mm, preferably from 1 mm to 3.5 mm. The diameter of the filament can be chosen to feed a specific FFF 3D printer. An example of filament diameter used in FFF processes is about 1.75 mm or about 2.85 mm. The filament is preferably made by extruding the polymer composition.

According to some embodiments, the polymer composition is in the form of microparticles or a powder, for example having an average diameter, also called $d_{50}$, ranging from 1 to 200 µm, preferably from 10 to 100 µm, preferably from 20 to 80 µm as measured by electron microscopy or laser scattering. Preferably, the microparticles, powder or powdered material are suitable for use in additive manufacturing methods as described above, such as SLS.

Selective laser sintering ("SLS"), one of the available additive manufacturing techniques, uses electromagnetic radiation from a laser to fuse powdered materials into a mass. The laser selectively fuses the powdered material by scanning cross-sections generated from the digital blueprint of the object on the surface of a powder bed. After a cross-section is scanned, the powder bed is lowered by one layer thickness, a new layer of material is applied, and the bed is rescanned. Locally full coalescence of polymer particles in the top powder layer is necessary as well as an adhesion with previous sintered layers. This process is repeated until the object is completed.

In some embodiments, the 3D printing method may comprise a step of depositing successive layers of the powder and a step of selectively sintering each layer prior to deposition of the subsequent layer. According to an embodiment, the step of printing layers comprises selective sintering by means of a high power energy source, for example a high power laser source such as an electromagnetic beam source.

In some embodiments, the powder may be heated before the sintering step to a temperature Tp (° C.), close to the melting point (Tm) of the PEEK-PEoEK copolymer. The preheating of the powder makes it easier for the laser to raise the temperature of the selected regions of layer of unfused powder to the melting point. The laser causes fusion of the powder only in locations specified by the input. Laser energy exposure is typically selected based on the polymer in use and to avoid polymer degradation.

The 3D object/article/part may be built on substrate, for example a horizontal substrate and/or on a planar substrate. The substrate may be moveable in all directions, for example in the horizontal or vertical direction. During the 3D printing process, the substrate can, for example, be lowered, in order for the successive layer of un-sintered polymeric material to be sintered on top of the former layer of sintered polymeric material.

According to an embodiment, the 3D printing process further comprises a step consisting in producing a support structure. According to this embodiment, the 3D object/article/part is built upon the support structure and both the support structure and the 3D object/article/part are produced using the same AM method. The support structure may be useful in multiple situations. For example, the support structure may be useful in providing sufficient support to the printed or under-printing, 3D object/article/part, in order to avoid distortion of the shape 3D object/article/part, especially when this 3D object/article/part is not planar. This is particularly true when the temperature used to maintain the printed or under-printing, 3D object/article/part is below the re-solidification temperature of the powder.

The 3D printing method usually takes place using a printer. The SLS printer may comprise a sintering chamber and a powder bed, both maintained at determined at specific temperatures.

FFF 3D printers are, for example, commercially available from Apium, from Roboze, from Hyrel or from Stratasys, Inc. (under the trade name) Fortus®. SLS 3D printers are, for example, available from EOS Corporation under the trade name EOSINT® P. FRTP 3D printers are, for example, available from Markforged.

PAM 3D printers are, for example, commercially available from Pollen. BAAM (Big Area Additive Manufacturing) is an industrial sized, additive machine commercially available from Cincinnati Inc.

SLS 3D printers are, for example, available from EOS Corporation under the trade name EOSINT® P.

Polymer-Metal Junction and Methods of Making

According to the present invention, the shaped article may include a polymer-metal junction. The polymer-metal junction comprises the PEEK-PEoEK copolymer or any composition comprising the same, as described above, in contact with a metal substrate.

The metal substrate can include any metallic composition including, but not limited to, aluminum, copper, gold, iron, nickel, platinum, silver, steel, and blends or alloys thereof (e.g., brass and bronze). The metal substrate is preferably copper, steel, aluminum, or a combination thereof, most preferably aluminum.

In some embodiments, the metal substrate (e.g. an aluminum substrate) has a structured metal surface. "Structured metal surface" as used herein means a metal surface that has undergone any etching process to roughen the metal surface by removing at least part of the metal. Examples of structured metal surfaces include laser etched metal surfaces and chemically etched metal surfaces. In some embodiments, the metal surface is an un-etched metal surface.

In some aspects, the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate includes an NMT-treated metal surface. An "NMT-treated metal surface" means a nano-structured surface prepared by any etching/priming process described in EP1459882 B1, EP1559542 A1, or WO 2011123790 A1, the disclosures of which are incorporated herein by reference in their entireties.

In some embodiments, the metal substrate is a wire or cable. In alternative embodiments, the metal substrate is a part of a mobile electronic device.

In some embodiments, the polymer-metal junction includes a layer of the polymer composition having a thickness ranging from 0.025 mm to 3 mm.

The polymer-metal junction can be made by contacting the PEEK-PEoEK copolymer or the composition comprising the same, as described herein, with the metal substrate, preferably a structured metal surface, more preferably a nano-structured metal surface, most preferably an NMT-treated metal surface. For example, the PEEK-PEoEK copolymer or the composition comprising the same may be deposited on or over-molded onto the metal substrate using any suitable melt-processing and deposition method. In particular, the polymer-metal junction may be made by injection or compression molding, or coating the PEEK-PEoEK copolymer or the composition comprising the same, onto the metal substrate. The polymer-metal junction can also be formed by an electrostatic or solvent-borne powder coating process. In some aspects, the polymer-metal junction can be formed by an extrusion process for coating a wire or cable. In alternative embodiments the polymer-metal junction is made by an additive manufacturing process.

The polymer-metal junction of the invention may be well suited for the manufacture of articles useful in a wide variety of applications. For example, the properties of the PEEK-PEoEK copolymer described herein makes the polymer composition especially suitable for use in automotive applications such as magnet wire coatings in hybrid and electric vehicles, oil and gas applications such as downhole cable coatings, structural components for mobile electronic devices (e.g., framework or housing) including a metal part, electrostatic powder coatings on metal substrates for corrosion protection and abrasion resistance.

Method of Making the PEEK-PEoEK Composite

Additional exemplary embodiments are directed to methods of making PEEK-PEoEK composites comprising impregnating the reinforcing fibers described above with the polymer matrix described herein.

Various methods can be employed by which fibers may be impregnated with the polymer matrix, wherein the matrix is either in molten or particulate form, including, for example, powder coating, film lamination, extrusion, pultrusion, aqueous slurry, and melt impregnation, to form plies in the form of, for example, sheets or tapes of fibers that are at least partially impregnated with the polymer matrix. As used herein, "tape" means a strip of material with longitudinally extending reinforcement fibers that are aligned along a single axis of the strip material.

Plies of matrix impregnated fibers may be placed adjacent one another to form an unconsolidated composite laminate, such as a prepreg. The fiber reinforced layers of the laminate may be positioned with their respective fiber reinforcements in selected orientations relative to one another.

The plies may be stacked, manually or automatically, e.g., by automated tape layup using "pick and place" robotics, or advanced fiber placement wherein pre-impregnated tows of fibers are heated and compacted in a mold or on a mandrel, to form a composite laminate having desired physical dimensions and fiber orientations.

The layers of an unconsolidated laminate are typically not completely fused together and the unconsolidated composite laminate may exhibit a significant void content, e.g., greater than 20% by volume as measured by x-ray microtomography. Heat and/or pressure may be applied, or sonic vibration welding may be used, to stabilize the laminate and prevent the layers from moving relative to one another, e.g., to form a composite material "blank", as an intermediate step to allow handling of the composite laminate prior to consolidation of the composite laminate.

The composite laminate so formed is subsequently consolidated, typically by subjecting the composite laminate to heat and pressure, e.g., in a mold, to form a shaped fiber reinforced thermoplastic matrix composite article. As used herein, "consolidation" is a process by which the matrix material is softened, the layers of the composite laminate are pressed together, air, moisture, solvents, and other volatiles are pressed out of the laminate, and the adjacent plies of the composite laminate are fused together to form a solid, coherent article. Ideally, the consolidated composite article exhibits minimal, e.g., less than 5% by volume, more typically less than 2% by volume, void content as measured by x-ray microtomography.

The PEEK-PEoEK composite preferably comprises from 20 to 80 wt. % of reinforcing fibers and from 80 to 20 wt. % of the polymer matrix, based on the weight of the PEEK-PEoEK composite.

Should the disclosure of any patents, patent applications, and publications which are incorporated herein by reference conflict with the description of the present application to the extent that it may render a term unclear, the present description shall take precedence.

Exemplary embodiments will now be described in the following non-limiting examples.

EXAMPLES

Experimental Section

Raw Materials

KETASPIRE® KT-880P [MV (410° C., 46 s$^{-1}$) is 0.18 kPa·s, Tm=344° C.], is an aromatic polyetheretherketone (PEEK) polymer available from Solvay Specialty Polymers USA, LLC.

Hydroquinone, photo grade, was procured from Eastman, USA. It contained 0.38 wt % moisture, which amount was used to adapt the charge weights. All weights indicated include moisture.

Resorcinol, ACS reagent grade, was procured from Aldrich, USA 4,4'-Biphenol, polymer grade, was procured from SI, USA.

Pyrocatechol, flakes, was procured from Solvay USA. Its purity was 99.85% by GC. It contained 680 ppm moisture, which amount was used to adapt the charge weights. All weights indicated include moisture.

4,4'-Difluorobenzophenone, polymer grade (99.8%+), was procured from Malwa, India.

Diphenyl sulfone (polymer grade) was procured from Proviron (99.8% pure).

Sodium carbonate, light soda ash, was procured from Solvay S.A., France.

Potassium carbonate with a $d_{90}$<45 µm was procured from Armand products.

Lithium chloride (anhydrous grade) was procured from Acros.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (filed Nov. 25, 1992 and incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (filed Feb. 24, 1992 and incorporated herein by reference in its entirety). They were purified by recrystallization in DMF/ethanol.

Determination of the Melting Temperature (Tm), Crystallization Temperature (Tc) and Heat of Fusion The melting temperature Tm was determined as the peak temperature of the melting endotherm on the 2nd heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:
- 1$^{st}$ heat cycle: 30.00° C. to 400.00° C. at 20.00° C./min, isothermal at 400.00° C. for 1 min;
- 1$^{st}$ cool cycle: 400.00° C. to 30.00° C. at 20.00° C./min, isothermal for 1 min;
- 2$^{nd}$ heat cycle: 30.00° C. to 400.00° C. at 20.00° C./min, isothermal at 400.00° C. for 1 min.

The melting temperature Tm was determined as the peak temperature of the melting endotherm on the 2$^{nd}$ heat scan. The enthalpy of fusion was determined on the 2$^{nd}$ heat scan. The melting of the composition was taken as the area over a linear baseline drawn from 220° C. to a temperature above the last endotherm.

The glass transition temperature Tg (mid-point) was determined on the 2$^{nd}$ heat scan according to ASTM D3418-03, E1356-03, E793-06, E794-06.

The crystallization temperature Tc was determined as the peak temperature of the crystallization exotherm on the 1$^{st}$ cool scan.

Determination of the Melt Viscosity and Melt Stability

The melt viscosity was measured using a capillary rheometer according to ASTM D3835. Readings were taken after 10-minute and 40-minute dwell time at 410° C. and a shear rate of 46.3 s$^{-1}$ using a conical die with the following characteristics: diameter=1.016 mm, length=20.32 mm, cone angle=120°. The melt stability VR40 was determined as the ratio of the melt viscosity determined in aforementioned conditions, after 40 minutes dwell time, over the melt viscosity determined in same conditions, after 10 minutes dwell time.

Determination of Tensile Properties

A 762 mm×762 mm×3.2 mm plaque was prepared from the polymer by compression molding of 30 g of polymer under the following conditions:
- preheat at a temperature $T_1$,
- maintain $T_1$ for 20 minutes, under 2000 kg-f
- maintain $T_1$ for 2 minutes, under 2700 kg-f
- cool down to 30° C. over 40 minutes, under 2000 kg-f.

$T_1$ values used for the polymers are indicated in the results table.

The plaques were then annealed at 200° C. for 3 hours.

The 762 mm×762 mm×3.2 mm compression molded plaques were machined into Type V ASTM tensile specimens and these specimens of the various polymer compositions were subjected to tensile testing according to ASTM method D638 at 0.05 inch/minute room temperature (i.e. 23° C.) on 3 specimens. The average of the 3 specimens is presented.

Determination of Dielectric Properties at 2.4 GHz

Using the compression molded plaque prepared as described above, the dielectric constant and dissipation factor were measured at 2.4 GHz. using the guidelines of ASTM D2520, Method B—Resonant Cavity Perturbation Technique. One (1) replicate of each material was prepared for measurement. Each test sample consisted of one piece of material 0.08 in×0.20 in×1.0 in.

Determination of Peak Degradation Temperature

The peak degradation temperature was determined by thermal gravimetric analysis ("TGA") according to the ASTM D3850. TGA was performed on a TA Instruments TGA Q500 from TGA was performed on a TA Instruments TGA Q500 from 30° C. to 800° C. under nitrogen (60 mL/min) at 10° C./minute. A 15-20 mg sample of dry polymer (i.e. dried at 120° C./vac overnight before testing) was used for the analysis. The peak degradation temperature was determined as the temperature at which the weight loss derivative (% wt loss/° C.) reaches a maximum. In case there are multiple maxima in the derivative weight loss curve, the peak to consider is the one with at least 1% wt loss/° C. and appearing at the lowest temperature.

Determination of Elemental Impurities Such as Calcium, Sodium, Phosphorus by ICP-OES A clean, dry platinum crucible was placed onto an analytical balance, and the balance was zeroed. One half to 3 grams of polymer sample was weighed into a boat and its weight was recorded to 0.0001 g. The crucible with sample was placed in a muffle furnace (Thermo Scientific Thermolyne F6000 Programmable Furnace). The furnace was gradually heated to 525° C. and held at that temperature for 10 hours to dry ash the sample. Following ashing, the furnace was cooled down to room temperature, and the crucible was taken out of the furnace and placed in a fume hood. The ash was dissolved in diluted hydrochloric acid. The solution was transferred to a 25 mL volumetric flask, using a polyethylene pipette. The crucible was rinsed twice with approximately 5 mL of ultrapure water (R<18 MΩcm) and the washes were added to a volumetric flask to effect a quantitative transfer. Ultrapure water was added to total 25 mL in the flask. A stopper was put on the top of the flask and the contents were shaken well to mix.

ICP-OES analysis was performed using an inductively-coupled plasma emission spectrometer Perkin-Elmer Optima 8300 dual view. The spectrometer was calibrated using a set of NIST traceable multi-element mixed standards with analyte concentrations between 0.0 and 10.0 mg/L. A linear calibration curve was obtained in a range of concentrations with a correlation coefficient better than 0.9999 for each of 48 analytes. The standards were run before and after every ten samples to ensure instrument stability. The results were reported as an average of three replicates. The concentration of elemental impurities in the sample was calculated with the following equation:

$$A = (B*C)/(D)$$

where:
A=concentration of element in the sample in mg/kg (=wt·ppm)
B=element in the solution analyzed by ICP-OES in mg/L
C=volume of the solution analyzed by ICP-OES in mL
D=sample weight in grams used in the procedure.

Determination of FTIR Spectrum

Fourier transform infrared (FT-IR) measurements were made on a Bruker Vertex 70 FTIR spectrometer at 4 cm$^{-1}$ resolution and 32 scans using OPUS software (version 7.5, Bruker). A single reflection diamond ATR accessory (Platinum ATR, Bruker) mounted on Bruker's universal Quick-Lock sample compartment base plate was used for the sample FT-IR spectral measurement. The FT-IR spectra were collected in the 4000-400 cm$^{-1}$ spectral region. The FT-IR measurement procedure included measurement of a single beam background scan of the cleaned diamond ATR crystal and measurement of a sample FT-IR scan. For powder samples no sample preparation was required, a sample was placed in ATR and the spectra were recorded using FT-IR spectrometer. The polymer was analyzed in powder form of mean particle size of 100-700 μm, typically 200-500 μm.

The FT-IR spectrometer generated a graph in the form of an absorbance or transmittance spectra, which showed the unique chemical bonds and the molecular structure of the inventive PEEK-PEoEK copolymers of the present invention.

Synthesis Examples

Comparative Example 1: Use is Made of PEEK KetaSpire® 820P

Comparative Example 2: PEKK with a 60/40 T/I Ratio

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.051 g of 1,4-DFDK. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 270° C. At 270° C., 13.725 g of Na$_2$CO$_3$ and 0.086 g of K$_2$CO$_3$ was added via a powder dispenser to the reaction mixture over 60 minutes. At the end of the addition, the reaction mixture was heated to 320° C. at 1° C./minute. After 2 minutes at 320° C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.503 g of 1,4-DFDK were added to the reactor and the reaction mixture was kept at temperature for 15 minutes. Another charge of 25 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of NaH$_2$PO$_4$.2H$_2$O and 0.62 g of Na$_2$HPO$_4$ were dissolved in 1200 mL DI water for the last wash. The powder was then removed from the reactor and dried at 120° C. under vacuum for 12 hours yielding 72 g of a yellow powder.

Comparative Example 3: Preparation of PEEK-PEDEK Copolymer 75/25

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 128.21 g of diphenyl sulfone, 20.297 g of hydroquinone, 11.411 g of 4,4'-biphenol and 54.377 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 150° C. At 150° C., a mixture of 26.955 g of Na$_2$CO$_3$ and 0.169 g of K$_2$CO$_3$ was added via a powder dispenser to the reaction mixture over 30 minutes. At the end of the addition, the reaction mixture was heated to 320° C. at 1° C./minute. After 13 minutes at 320° C., 3.742 g of 4,4'-difluorobenzophenone were added to the reaction mixture while keeping a nitrogen purge on the reactor. After 5 minutes, 1.039 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The repeat unit of the polymer is:

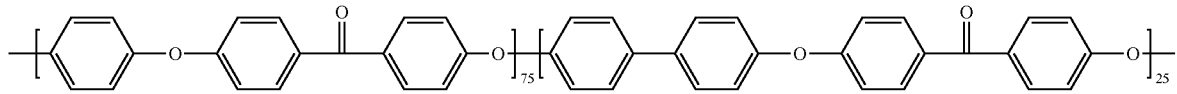

The melt viscosity measured by capillary rheology at 410° C., 46 s¹ was 0.28 kN-s/m². The properties of the final polymer are detailed in table 6.

Comparative Example 4: Preparation of PEEK-PEDEK Copolymer 80/20

The same procedure as comparative example 1 was followed but with the following reagents amounts:

TABLE 1

| Reagent | Wt (g) |
| --- | --- |
| Diphenyl sulfone | 128.21 |
| Hydroquinone | 21.933 |
| 4,4'-biphenol | 9.244 |
| 4,4'-difluorobenzophenone | 55.054 |
| Na$_2$CO$_3$ | 27.294 |
| K$_2$CO$_3$ | 0.171 |
| Time at 320° C. | 11 minutes |

TABLE 1-continued

| Reagent | Wt (g) |
| --- | --- |
| 4,4'-difluorobenzophenone in first termination | 3.789 |
| Lithium chloride in second termination | 1.052 |
| 4,4'-difluorobenzophenone in third termination | 2.165 |

The melt viscosity measured by capillary rheology at 410° C., 46 s$^{-1}$ was 0.16 kN-s/m². The properties of the final polymer are detailed in table 6.

Comparative Example 6: Preparation of PEEK-PEmEK Copolymer 80/20

In a 1000 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 330.00 g of diphenyl sulfone, 52.106 g of hydroquinone, 13.002 g of resorcinol and 132.00 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 64.995 g of Na$_2$CO$_3$ and 0.244 g of K$_2$CO$_3$ was added via a powder dispenser to the reaction mixture over 30 minutes. At the end of the addition, the reaction mixture was heated to 300° C. at 1° C./minute. After 32 minutes at 300° C., 20.586 g of 4,4'-difluorobenzophenone were added to the reaction mixture while keeping a nitrogen purge on the reactor. After 5 minutes, 2.500 g of lithium chloride were added to the reaction mixture. 10 minutes later, another 5.146 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 165 g of a light brown powder.

The repeat unit of the polymer is:

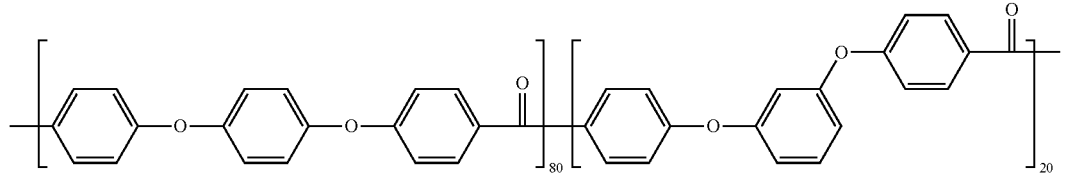

The melt viscosity measured by capillary rheology at 410° C., 46 s$^{-1}$ was 0.31 kN-s/m². The properties of the final polymer are detailed in table 6.

Comparative Example 5: Preparation of PEEK-PEmEK Copolymer 75/25

The same procedure as comparative example 3 was followed but with the reagents amounts specified in Table 2 below. The properties of the resulting polymer are in table 6.

TABLE 2

| Reagent | Units | Ex 3a |
| --- | --- | --- |
| PEEK/PEmEK |  | 75/25 |
| Diphenyl sulfone | g | 330.17 |
| Hydroquinone | g | 40.660 |
| resorcinol | g | 13.528 |
| 4,4'-difluorobenzophenone | g | 109.875 |
| Na$_2$CO$_3$ | g | 54.153 |
| K$_2$CO$_3$ | g | 0.170 |

TABLE 2-continued

| Reagent | Units | Ex 3a |
|---|---|---|
| Time at 300° C. | minutes | 52 |
| 4,4'-difluorobenzophenone in first termination | g | 7.496 |
| Lithium chloride in second termination | g | 2.081 |
| 4,4'-difluorobenzophenone in third termination | g | 4.284 |
| Polymer weight | g | 127 |

Example 7: Preparation of PEEK-PEoEK Copolymer 95/5

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.62 g of diphenyl sulfone, 27.491 g of hydroquinone, 1.443 g of pyrocatechol and 57.854 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 28.797 g of $Na_2CO_3$ and 0.181 g of $K_2CO_3$ was added via a powder dispenser to the reaction mixture over 30 minutes. At the end of the addition, the reaction mixture was heated to 320° C. at 1° C./minute. After 25 minutes at 320° C., the reaction was terminated in 3 stages: 6.860 g of 4,4'-difluorobenzophenone were added to the reaction mixture while keeping a nitrogen purge on the reactor. After 5 minutes, 0.894 g of lithium chloride were added to the reaction mixture. 10 minutes later, another 2.287 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture by extracting successively:

1. 4 times with 1200 mL acetone at room temperature (30-minute per cycle)
2. 2 times with 1200 mL demineralized water at room temperature (30-minute per cycle)
3. 1 time with 1200 mL demineralized water containing 8.00 g of 37% hydrochloric acid at room temperature (30-minute per cycle)
4. 2 times with 1200 mL demineralized water at room temperature (30-minute per cycle)
5. 1 time with 1200 mL demineralized water containing 0.67 g $NaH_2PO_4.2H_2O + 0.62\ Na_2HPO_4$ at room temperature (30-minute per cycle)
6. 2 times with 1200 mL acetone at room temperature (30-minute per cycle)

The powder was then dried at 120° C. under vacuum for 12 hours yielding 67 g of a white powder.

The repeat unit of the polymer is:

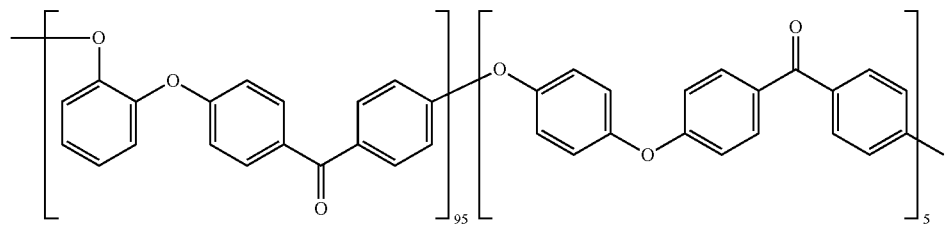

The melt viscosity measured by capillary rheology at 410° C., 46 $s^{-1}$ was 0.49 $kN\text{-}s/m^2$. The properties of the polymer are disclosed in table 6 below.

Examples 8-13: Preparation of PEEK-PEoEK Copolymer 90/10, 85/15, 80/20, 75/25, 70/30

The same procedure as comparative example 7 was followed but with the following reagents amounts. The properties of the resulting polymer are in tables 6 and 7. Examples 9-13 were run in a 1 L reactor instead of 500 mL.

TABLE 3

| | | Examples 8-13 reagents | | | | | |
|---|---|---|---|---|---|---|---|
| Reagent | Units | Ex 8 | Ex 9 | Ex. 10 | Ex. 11 | Ex. 12 | Ex. 13 |
| PEEK/PEoEK | | 90/10 | 85/15 | 80/20 | 80/20 | 75/25 | 70/30 |
| Diphenyl sulfone | g | 128.62 | 343.63 | 343.63 | 343.63 | 343.63 | 343.63 |
| Hydroquinone | g | 26.044 | 65.718 | 61.852 | 61.852 | 57.987 | 54.121 |
| pyrocatechol | g | 2.887 | 11.569 | 15.426 | 15.426 | 19.282 | 23.139 |
| 4,4'-difluorobenzophenone | g | 57.854 | 154.573 | 153.809 | 154.573 | 154.573 | 153.351 |
| $Na_2CO_3$ | g | 28.797 | 76.938 | 76.938 | 76.938 | 76.938 | 76.938 |
| $K_2CO_3$ | g | 0.181 | 0.484 | 0.484 | 0.484 | 0.484 | 0.484 |

TABLE 3-continued

Examples 8-13 reagents

| Reagent | Units | Ex 8 | Ex 9 | Ex. 10 | Ex. 11 | Ex. 12 | Ex. 13 |
|---|---|---|---|---|---|---|---|
| Time at 320° C. | minutes | 1 | 7 | 13 | 1 | 16 | 73 |
| 4,4'-difluorobenzophenone in first termination | g | 6.860 | 18.329 | 18.329 | 18.329 | 18.329 | 18.329 |
| Lithium chloride in second termination | g | 0.894 | 2.388 | 2.388 | 2.388 | 2.388 | 2.388 |
| 4,4'-difluorobenzophenone in third termination | g | 2.287 | 6.110 | 6.110 | 6.110 | 343.63 | 6.110 |
| Polymer weight | g | 68 | 190 | 191 | 174 | 188 | 188 |
| Acetone per cycle in extraction | mL | 1200 | 3600 | 3600 | 3600 | 3600 | 3600 |
| DM water per cycle in extraction | mL | 1200 | 3600 | 3600 | 3600 | 3600 | 3600 |
| 37% HCl | g | 8.00 | 24.0 | 24.0 | 24.0 | 24.0 | 24.0 |
| $NaH_2PO_4 \cdot 2H_2O$ | g | 0.67 | 2.01 | 2.01 | 2.01 | 2.01 | 2.01 |
| $Na_2HPO_4$ | g | 0.62 | 1.86 | 1.86 | 1.86 | 1.86 | 1.86 |

Example 14: Preparation of PEEK-PEoEK Copolymer 75/25 with Phenol as Monofunctional End Cap In a 1000 mL 4-neck reaction flask fitted with a stirrer, a N2 inlet tube, a Claisen adapter with a thermocouple plunging in the reaction medium, and a Dean-Stark trap with a condenser and a dry ice trap were introduced 343.63 g of diphenyl sulfone, 57.987 g of hydroquinone, 19.282 g of pyrocatechol, 0.988 g phenol and 152.740 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 76.938 g of $Na_2CO_3$ and 0.484 g of $K_2CO_3$ was added via a powder dispenser to the reaction mixture over 30 minutes. At the end of the addition, the reaction mixture was heated to 320° C. at 1° C./minute. After 20 minutes at 320° C., the reactor content was poured from the reactor into a SS pan and cooled. The solid was broken up and ground in an attrition mill through a 2 mm screen. Diphenyl sulfone and salts were extracted from the mixture by extracting successively:

1. 4 times with 3600 mL acetone at room temperature (30-minute per cycle)
2. 2 times with 3600 mL demineralized water at room temperature (30-minute per cycle)
3. 1 time with 3600 mL demineralized water containing 24.00 g of 37% hydrochloric acid at room temperature (30-minute per cycle)
4. 2 times with 3600 mL demineralized water at room temperature (30-minute per cycle)
5. 1 time with 3600 mL demineralized water containing 2.01 g $NaH_2PO_4.2H_2O$+1.86 $Na_2HPO_4$ at room temperature (30-minute per cycle)
6. 2 times with 3600 mL acetone at room temperature (30-minute per cycle)

The powder was then dried at 120° C. under vacuum for 12 hours yielding 180 g of a white powder.

The properties of the resulting polymer are in Tables 6 and 7.

Examples 15-16: Preparation of PEEK-PEoEK Copolymer 75/25 with 4-phenoxyphenol as Monofunctional End Cap or 4-phenylphenol The same procedure as example 14 was followed but with the reagents amounts specified in Table 4. The properties of the resulting polymer are in Tables 6 and 7.

Comparative Example 17: Preparation of PEEK-PEoEK Copolymer 80/20 According to JP JP1221426

The procedure described in JP1221426 was replicated.

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 468.39 g of N-methylpyrrolidinone, 32.593 g of hydroquinone, 8.148 g of pyrocatechol, 81.549 g of 4,4'-difluorobenzophenone, 45.556 g of $Na_2CO_3$ and 16 mL of toluene. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 200° C. over 50 minutes. The reaction mixture was held at 200° C. for 4 hours while toluene was refluxed to the reaction mixture. The reaction mixture was then cooled down to room temperature and coagulated with 1 L acetone in a Waring blender. The solid was filtered on a Buchner funnel and:
1. washed 3 more times with 1 L acetone at room temperature for 30 minutes per cycle, then
2. Washed 3 times with 1000 mL demineralized water at room temperature (30-minute per cycle)

The powder was then dried at 120° C. under vacuum for 12 hours yielding 100 g of a white powder.

The properties of the resulting polymer are in Table 7.

Comparative Example 18: Preparation of PEEK-PEoEK Copolymer 70/30 According to JP JP1221426

The same procedure as comparative example 17 was followed but with the reagents amounts specified in Table 5. The properties of the resulting polymer are in Table 7.

TABLE 5

| Comparative example 18 reagents | | |
|---|---|---|
| Reagent | Units | Ex. 15 |
| PEEK/PEoEK |  | 70/30 |
| NMP | g | 468.39 |
| Hydroquinone | g | 28.518 |
| pyrocatechol | g | 12.222 |
| 4,4'-difluorobenzophenone | g | 81.549 |
| toluene | mL | 16 |
| Na$_2$CO$_3$ | g | 45.556 |
| Acetone per cycle in extraction | mL | 1000 |
| DM water per cycle in extraction | mL | 1000 |
| Polymer weight | g | 100 |

Comparative Example 19: Preparation of PEEK-PEoEK Copolymer 70/30 According to Ben Haida et at The procedure described in Ben Haida et al was replicated.

In a 1000 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 250.48 g of diphenyl sulfone, 20.237 g of hydroquinone, 8.612 g of pyrocatechol and 57.226 g of 4,4'-difluorobenzophenone. The flask content was evacuated under vacuum and then filled with high purity nitrogen (containing less than 10 ppm O$_2$). The reaction mixture was then placed under a constant nitrogen purge (60 mL/min).

The reaction mixture was heated slowly to 200° C. At 200° C., 39.214 g of K$_2$CO$_3$ were added via a powder dispenser to the reaction mixture over 20 minutes. The reaction mixture was held at 200° C. for 1 h then heated up to 320° C. After 3 hours minutes at 320° C., the reactor content was poured from the reactor into a SS pan and cooled. The solid was broken up and ground in an attrition mill through a 2 mm screen. Diphenyl sulfone and salts were extracted from the mixture by successively:

1. Dissolving the mixture in 860 mL DMAc
2. Precipitating the polymer from the DMAC solution in 4.3 L of methanol in a Waring blender
3. Filtering the solid on Buchner funnel
4. Washing the solid with 4.3 L methanol for 30 minutes at room temperature
5. Washing the solid 2 times with 2 L DM water at reflux (30-minute per cycle)

The powder was then dried at 70° C. under vacuum for 12 hours yielding 167 g of a white powder. The properties of the resulting polymer are in Table 7.

Comparative Example 20: Preparation of PEEK-PEoEK Copolymer (70/30) with No HCl, No Phosphate Buffer in the Washing The same procedure was followed as for example 13 but with a modified polymer recovery. At the end of the reaction, the diphenyl sulfone and salts were extracted from the mixture by extracting successively:

1. 6 times with 3600 mL acetone at room temperature (30-minute per cycle)
2. 7 times with 3600 mL demineralized water at room temperature (30-minute per cycle)

The powder was then dried at 120° C. under vacuum for 12 hours yielding 180 g of a white powder. The properties of the resulting polymer are in Table 7.

Comparative Example 21: Preparation of PEEK-PEoEK Copolymer (75/25) with No HCl, No Phosphate Buffer in the Washing The same procedure was followed as for example 10 but with a modified polymer recovery. At the end of the reaction, the diphenyl sulfone and salts were extracted from the mixture by extracting successively:

6 times with 3600 mL acetone at room temperature (30-minute per cycle)
7 times with 3600 mL demineralized water at room temperature (30-minute per cycle)

The powder was then dried at 120° C. under vacuum for 12 hours yielding 180 g of a white powder. The properties of the resulting polymer are in table 7.

The data presented in Table 7 shows that the PEEK-PEoEK according to the invention exhibits the following improved properties over the PEEK-PEoEK described in the literature or obtained using different reaction and washing procedures:

Improved melt stability as shown by VR40 in the range 0.75-1.25
Improved thermal stability as shown by peak degradation temperature of at least 550° C.
Lower dissipation factor @ 2.4 GHz.

Should the disclosure of any patents, patent applications, and publications which are incorporated herein by reference conflict with the description of the present application to the extent that it may render a term unclear, the present description shall take precedence.

Table 6 Presents the Properties of the Samples Prepared According to Examples 1-16

| Property | Units | CE1 | CE2 | CE3 | CE4 | CE5 | CE6 | E7 | E8 |
|---|---|---|---|---|---|---|---|---|---|
| PAEK unit |  | None | PEKK | PEDEK | PEDEK | PEmEK | PEmEK | PEoEK | PEoEK |
| PEEK/PAEK ratio (mol/mol) |  | 100/0 | 0/100 | 75/25 | 80/20 | 75/25 | 80/20 | 95/5 | 90/10 |
| MV (410° C., 46 s$^{-1}$) | kN-s/m$^2$ | 1.1 | 0.58 | 0.28 | 0.16 | 2.14 | 0.31 | 0.49 | 0.48 |
| Tg | ° C. | 151 | 160 | 153 | 151 | 141 | 135 | 148 | 148 |
| Tm | ° C. | 340 | 301 | 304 | 312 | 302 | 311 | 333 | 322 |
| Tc | ° C. | 282 | 208 | 240 | 256 | 239 | 243 | 283 | 254 |
| Heat fusion | J/g | 50 | 8 | 38 | 41 | 43 | 53 | 46 | 48 |

-continued

| | | | | | | | | | |
|---|---|---|---|---|---|---|---|---|---|
| $T_1$ molding | °C. | 421 | 343 | 343 | 365 | 354 | 377 | 388 | 377 |
| Tensile strength at yield or at break | psi | 13900 | N/A | 11400 @break | 13500 | 14000 @ break | 9160@ break | N/A | N/A |
| Tensile (Young) modulus | ksi | 561 | N/A | 523 | 522 | 607 | 644 | 567 | 519 |
| Dielectric constant @ 2.4 GHz | | 3.16 | 3.26 | 3.13 | 3.15 | 3.15 | 3.15 | | |
| Dissipation factor @ 2.4 GHz | | 0.0026 | 0.0032 | 0.0025 | 0.0025 | 0.0021 | 0.0020 | | |

| Property | Units | E9 | E10 | E11 | E12 | E13 | E14 | E15 | E16 |
|---|---|---|---|---|---|---|---|---|---|
| PAEK unit | | PEoEK | PEoEK | PEoEK | PEoEK | PEoEK | PEoEK | PEoEK | PEoEK |
| PEEK/PAEK ratio (mol/mol) | | 85/15 | 80/20 | 80/20 | 75/25 | 70/30 | 75/25 | 75/25 | 75/25 |
| MV (410° C., 46 s$^{-1}$) | kN-s/m$^2$ | 0.33 | 1.95 | 0.33 | 0.32 | 1.41 | 1.32 | 0.08 | 1.01 |
| Tg | °C. | 146 | 146 | 146 | 143 | 145 | 147 | 143 | 147 |
| Tm | °C. | 315 | 299 | 304 | 293 | 283 | 289 | 298 | 290 |
| Tc | °C. | 260 | 187/254 | 224 | 193 | 253 | 200 | 247 | 202 |
| Heat fusion | J/g | 48 | 12 | 37 | 5 | 6 | 17 | 37 | 16 |
| $T_1$ molding | °C. | 368 | 368 | 368 | 343 | 343 | 343 | 343 | 343 |
| Tensile strength at yield or at break | psi | 14800 | 13400 | 14000 | 13700 | 13700 | 10141 | N/A | 13600 |
| Tensile (Young) modulus | ksi | 623 | 504 | 588 | 562 | 498 | 501 | | 549 |
| Dielectric constant @ 2.4 GHz | | 3.15 | | | | 3.17 | | | |
| Dissipation factor @ 2.4 GHz | | 0.0023 | | | | 0.0029 | | | |

Table 7 Presents the Properties of the Samples Prepared According to Examples 9-21

| Property | Units | E9 | E10 | E11 | E12 | E13 | E14 | E15 |
|---|---|---|---|---|---|---|---|---|
| PAEK unit | | PEoEK | PEoEK | PEoEK | PEoEK | PEoEK | PEoEK | PEoEK |
| PEEK/PAEK ratio (mol/mol) | | 85/15 | 80/20 | 80/20 | 75/25 | 70/30 | 75/25 | 75/25 |
| MV (410° C., 46 s$^{-1}$) | kN-s/m$^2$ | 0.33 | 1.95 | 0.33 | 0.32 | 1.41 | 1.32 | 0.08 |
| VR40 | | 1.02 | 0.98 | 1.05 | 1.04 | 0.83 | 1.19 | 0.75 |
| Tg | °C. | 146 | 146 | 146 | 143 | 145 | 147 | 143 |
| Tm | °C. | 315 | 299 | 304 | 293 | 283 | 289 | 298 |
| Heat fusion | J/g | 48 | 12 | 37 | 5 | 6 | 17 | 37 |
| $T_1$ molding | °C. | 368 | 368 | 368 | 343 | 343 | 343 | 343 |
| Dielectric constant @ 2.4 GHz | | 3.15 | | | | 3.17 | | |
| Dissipat on factor @ 2.4 GHz | | 0.0023 | | | | 0.0029 | | |
| peak degradation temperature | °C. | 567 | 565 | 577 | 577 | 562 | 560 | 553 |
| Ca | ppm | 0.9 | 2.1 | <0.9 | <0.9 | 1.1 | <1.7 | 1.4 |
| Na | ppm | 2.2 | 99 | 72 | 78 | 103 | 78 | 54 |
| P | ppm | 69 | 114 | 112 | 56 | 49 | 21 | 174 |
| Abs ratio 700 cm$^{-1}$/704 cm$^{-1}$ | | 0.99 | 0.97 | 0.97 | 0.97 | 0.98 | 0.98 | 0.98 |
| ratio 623 cm$^{-1}$/557 cm$^{-1}$ | | 1.41 | 1.28 | 1.32 | 1.39 | 1.39 | 1.51 | 1.25 |
| ratio 928 cm$^{-1}$/924 cm$^{-1}$ | | 0.98 | 1.04 | 1.05 | 1.07 | 1.06 | 1.08 | 1.03 |
| ratio 816 cm$^{-1}$/835 cm$^{-1}$ | | 0.65 | 0.71 | 0.67 | 0.63 | 0.65 | 0.61 | 0.74 |

| Property | Units | E16 | CE17 | CE18 | CE19 | CE20 | CE21 |
|---|---|---|---|---|---|---|---|
| PAEK unit | | PEoEK | PEoEK | PEoEK | PEoEK | PEoEK | PEoEK |
| PEEK/PAEK ratio (mol/mol) | | 75/25 | 80/20 | 70/30 | 70/30 | 70/30 | 75/25 |
| MV (410° C., 46 s$^{-1}$) | kN-s/m$^2$ | 1.01 | 2.43 | 3.51 | 0.46 | 2.54 | 1.77 |
| VR40 | | 1.03 | 1.23 | 1.40 | 0.09 | 1.03 | 1.14 |
| Tg | °C. | 147 | 148 | 145 | 143 | 145 | 147 |
| Tm | °C. | 290 | 293 | 279 | 285 | ND | 289 |
| Heat fusion | J/g | 16 | 22 | 0 | 4 | ND | 10 |
| $T_1$ molding | °C. | 343 | 368 | 343 | 343 | 343 | 343 |
| Dielectric constant @ 2.4 GHz | | | 3.17 | 3.12 | 3.17 | 3.16 | 3.16 |

-continued

| Property | Units | E9 | E10 | E11 | E12 | E13 | E14 | E15 |
|---|---|---|---|---|---|---|---|---|
| Dissipat on factor @ 2.4 GHz | | | 0.0031 | 0.0033 | 0.0037 | 0.0026 | 0.0030 | |
| peak degradation temperature | °C. | 552 | 537 | 511 | 519 | 534 | 545 | |
| Ca | ppm | 1.5 | 10.5 | 13.8 | 10.2 | 8.3 | 5.6 | |
| Na | ppm | 192 | 3236 | 6717 | 47 | 13649 | 70 | |
| P | ppm | 1.6 | 0.4 | <2.0 | 5.5 | 1.8 | | |
| Abs ratio 700 cm$^{-1}$/704 cm$^{-1}$ | | | 0.99 | 1.01 | 0.99 | 1.00 | 0.98 | 0.99 |
| ratio 623 cm$^{-1}$/557 cm$^{-1}$ | | | 1.37 | 2.16 | 1.68 | 1.35 | 1.35 | 1.46 |
| ratio 928 cm$^{-1}$/924 cm$^{-1}$ | | | 1.06 | 1.35 | 1.20 | 1.09 | 1.06 | 1.12 |
| ratio 816 cm$^{-1}$/835 cm$^{-1}$ | | | 0.65 | 0.38 | 0.50 | 0.63 | 0.66 | 0.58 |

The data presented in Table 7 shows that the PEEK-PEoEK according to the invention exhibits the following improved properties over the PEEK-PEoEK described in the literature or obtained using different reaction and washing procedures:

Improved melt stability as shown by VR40 in the range 0.75-1.25

Improved thermal stability as shown by peak degradation temperature of at least 550° C.

Lower dissipation factor @ 2.4 GHz

Should the disclosure of any patents, patent applications, and publications which are incorporated herein by reference conflict with the description of the present application to the extent that it may render a term unclear, the present description shall take precedence.

The invention claimed is:

1. A PEEK-PEoEK copolymer comprising at least 50 mol. %, collectively, of repeat units ($R_{PEEK}$) and repeat units ($R_{PEoEK}$), relative to the total number of moles of repeat units in the PEEK-PEoEK copolymer, wherein:

(a) repeat units ($R_{PEEK}$) are repeat units of formula (A):

$$\left[\begin{array}{c} \text{O} - \phantom{X} - \text{O} - \phantom{X} - \overset{\text{O}}{\underset{\text{C}}{\|}} - \phantom{X} \\ R^1_a \phantom{XXX} R^1_a \phantom{XXX} R^1_a \end{array}\right] \quad (A)$$

and (b) repeat units ($R_{PEoEK}$) are repeat units of formula (B):

$$\left[\begin{array}{c} \text{(B structure)} \\ R^2_b \phantom{XX} R^2_b \phantom{XX} R^2_b \end{array}\right] \quad (B)$$

wherein:

each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, each a and b is independently selected from the group consisting of integers ranging from 0 to 4, and the PEEK-PEoEK copolymer comprises the repeat units $R_{PEEK}$ and $R_{PEoEK}$ in a molar ratio $R_{PEEK}/R_{PEoEK}$ ranging from 95/5 to 70/30, and the PEEK-PEoEK copolymer possesses a microstructure such that its FT-IR spectrum, when recorded between 600 and 1000 cm$^{-1}$ in ATR mode on polymer powder, is such that the following inequalities are satisfied:

(i)

$$\frac{A_{700 cm^{-1}}}{A_{704 cm^{-1}}} \leq 0.99,$$

wherein $A_{700\ cm^{-1}}$ is the of absorbance at 700 cm$^{-1}$ and $A_{704\ cm^{-1}}$ is the absorbance at 704 cm$^{-1}$;

(ii)

$$\frac{A_{816 cm^{-1}}}{A_{835 cm^{-1}}} \geq 0.61,$$

wherein $A_{816\ cm^{-1}}$ is the of absorbance at 816 cm$^{-1}$ and $A_{835\ cm^{-1}}$ is the absorbance at 835 cm$^{-1}$;

(iii)

$$\frac{A_{623 cm^{-1}}}{A_{557 cm^{-1}}} \leq 1.60,$$

wherein $A_{623\ cm^{-1}}$ is the of absorbance at 623 cm$^{-1}$ and $A_{557\ cm^{-1}}$ is the absorbance at 557 cm$^{-1}$;

(iv)

$$\frac{A_{928 cm^{-1}}}{A_{924 cm^{-1}}} \leq 1.09,$$

wherein $A_{928\ cm^{-1}}$ is the of absorbance at 928 cm$^{-1}$ and $A_{924\ cm^{-1}}$ is the absorbance at 924 cm$^{-1}$; and the PEEK-PEoEK copolymer has a Calcium (Ca) content of less than 5 ppm, when measured by Inductively Coupled Plasma Optical Emission Spectrometry (ICP-OES), calibrated with standards of known calcium content.

2. The PEEK-PEoEK copolymer of claim 1, wherein the repeat units ($R_{PEEK}$) are repeat units of formula (A-1):

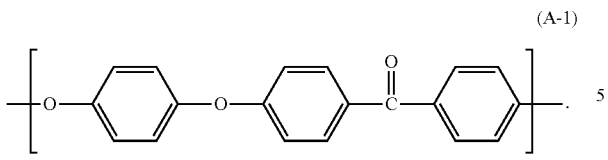

(A-1)

3. The PEEK-PEoEK copolymer of claim 1, wherein the repeat units ($R_{PEoEx}$) are repeat units of formula (B-1):

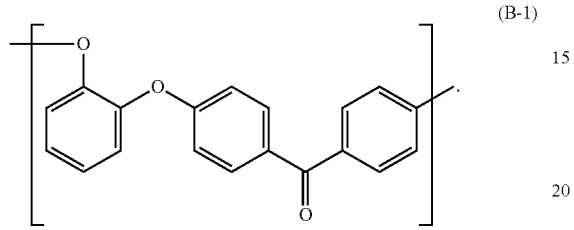

(B-1)

4. The PEEK-PEoEK copolymer of claim 1, presenting a Sodium (Na) content of less than 1,000 ppm, as measured by Inductively Coupled Plasma Optical Emission Spectrometry (ICP-OES) calibrated with standards of known sodium content.

5. The PEEK-PEoEK copolymer of claim 1, presenting a Phosphorus (P) content of at least 6 ppm, as measured by Inductively Coupled Plasma Optical Emission Spectrometry (ICP-OES) calibrated with standards of known phosphorus content.

6. The PEEK-PEoEK copolymer of claim 1, having a peak degradation temperature of at least 550° C., as measured by TGA according to ASTM D3850.

7. A polymer composition comprising:
(i) the PEEK-PEoEK copolymer of claim 1, and
(ii) at least one reinforcing filler, at least one additive, or a combination of both.

8. The polymer composition of claim 7, comprising at least 10 wt. % of the PEEK-PEoEK copolymer, based on the total weight of the polymer composition.

9. A method of making the PEEK-PEoEK copolymer of claim 1, comprising:
causing at least one difluoro-compound of formula (C):

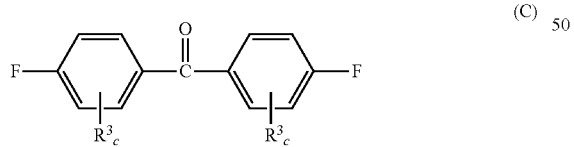

(C)

to react via (poly)condensation with a mixture comprising at least the di-hydroxy compounds of formulas (D) and (E):

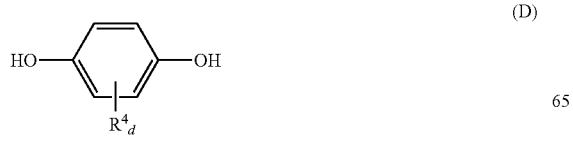

(D)

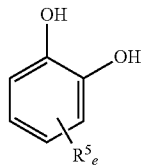

(E)

in a molar ratio (D)/(E) ranging from 95/5 to 70/30,
wherein each $R^3$, $R^4$, and $R^5$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each c, d, and e is independently selected from the group consisting of integers ranging from 0 to 4, at a temperature of 130 to 340° C., in the presence of a base, in a polar organic solvent, so as to obtain a reaction mixture;
optionally, terminating the (poly)condensation reaction by reaction with a suitable agent, so as to obtain a product mixture; and
recovering the PEEK-PEoEK copolymer by successively:
(a) isolating a solid phase comprising PEEK-PEoEK copolymer from the product mixture, by cooling the same at a temperature of below 120° C.;
(b) contacting the solid phase comprising the PEEK-PEoEK copolymer with a solvent having a normal boiling point of less than 100° C. at a temperature between 15 to 100° C. and separating a residual solid (1) from said solvent;
(c) optionally contacting the residual solid (1) with demineralized water at a temperature between 15 to 100° C. and separating a residual solid (1') from said demineralized water;
(d) contacting the residual solid (1) or (1') with an aqueous solution of a protic acid having a pKa of at most 6 at a temperature between 15 to 100° C., and separating a residual solid (2) from said demineralized water; and
either:
(e) optionally contacting the residual solid (2) with a solvent having a normal boiling point of less than 100° C. at a temperature between 15 to 100° C. and separating a residual solid (3) from said solvent;
(f) contacting the residual solid (2) or (3) with an aqueous buffer solution having a pH comprised between 6.0 and 7.0, at a temperature between 15 to 100° C., and separating a residual solid (4) from said aqueous buffer solution;
optionally, between steps (d) and (e) and/or between steps (e) and (f), contacting the residual solid with demineralized water at a temperature between 15 to 100° C., and separating a residual solid from said demineralized water;
wherein steps (b) to (f), with optional washings with demineralized water, are optionally repeated multiple times, and
(g) drying the residual solid (4) to obtain the PEEK-PEoEK copolymer;
or
(e') contacting the said residual solid (2) with an aqueous buffer solution having a pH comprised between 6.0 and 7.0, at a temperature between 15 to 100° C., and separating a said residual solid (3') from said aqueous buffer solution; and (f') optionally contacting the said residual solid (3') with a solvent having a normal boiling point of less than 100° C. at a temperature between 15 to 100° C. and separating the residual solid (4') from said solvent; and wherein steps (b) to (d), (e') and (f'), are optionally repeated multiple times, (g') drying the so-obtained residual solid (3') or (4') to obtain the PEEK-PEoEK copolymer.

10. The method of claim 9, wherein the compound of formula (C) is 4,4'-difluorobenzophenone (DFBP), the compound of formula (D) is hydroquinone, and/or the compound of formula (E) is catechol.

11. The method of claim 9, wherein the (poly)condensation reaction is carried out in the presence of an end-capping agent (F) in the initial mixture or with an excess of difluorocompound of formula (C), such that the molar ratio ((C)+(F))/((D)+(E)) is >1.000.

12. The method of claim 9, wherein the end-capping agent (F) is according to formula (F) below:

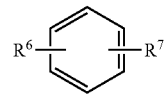
(F)

wherein $R^6$ is F, Cl, or OH, $R^7$ is C(O)—Ar—$R^{10}$, O—Ar—$R^{10}$, $SO_2$—Ar—$R^{10}$, Ar—$R^{10}$, an alkyl (e.g. a C1-C10 alkyl or a C1-C5 alkyl) or H, with Ar being an arylene group comprising at least one benzene ring, and $R^{10}$ is F, Cl or H.

13. A PEEK-PEoEK copolymer obtainable obtained by the method of claim 9.

14. A shaped article comprising the polymer composition of claim 6.

15. A method of making the shaped article of claim 14, comprising forming the shaped article by an additive manufacturing process.

* * * * *